US007764339B2

(12) United States Patent
Suemasu et al.

(10) Patent No.: US 7,764,339 B2

(45) Date of Patent: Jul. 27, 2010

(54) LIQUID CRYSTAL DISPLAY DEVICE

(75) Inventors: Atsushi Suemasu, Kawasaki (JP); Norihisa Moriya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 265 days.

(21) Appl. No.: 12/086,393

(22) PCT Filed: Dec. 12, 2006

(86) PCT No.: PCT/JP2006/324779

§ 371 (c)(1), (2), (4) Date: Jun. 12, 2008

(87) PCT Pub. No.: WO2007/069613

PCT Pub. Date: Jun. 21, 2007

(65) Prior Publication Data

US 2009/0109376 A1 Apr. 30, 2009

(30) Foreign Application Priority Data

Dec. 14, 2005 (JP) ............................ 2005-360256

(51) Int. Cl.
*G02F 1/1335* (2006.01)

(52) U.S. Cl. ........................................................ 349/96

(58) Field of Classification Search ....................... None
See application file for complete search history.

(56) References Cited

U.S. PATENT DOCUMENTS 5,699,137 A 12/1997 Kishimoto
7,486,352 B2 * 2/2009 Moriya ........................ 349/106
7,602,462 B2 * 10/2009 Koishi et al. ................ 349/117
2004/0156001 A1 * 8/2004 Moriya ........................ 349/117
2005/0068479 A1 * 3/2005 Moriya ........................ 349/117

FOREIGN PATENT DOCUMENTS

| | | |
|---|---|---|
| JP | A-05-142531 | 6/1993 |
| JP | A-09-101515 | 4/1997 |
| JP | A-2002-174724 | 6/2002 |
| JP | A-2002-174725 | 6/2002 |
| JP | A-2003-121852 | 4/2003 |
| JP | A-2005-003750 | 1/2005 |
| JP | A-2005-275322 | 10/2005 |

* cited by examiner

*Primary Examiner*—Sung H Pak
(74) *Attorney, Agent, or Firm*—Oliff & Berridge, PLC

(57) ABSTRACT

The invention intends to provide a liquid crystal display device that, even when a liquid crystal is fixed without completely maintaining a homeotropically aligned state, may effectively inhibit light from leaking.

A liquid crystal display device 1 includes: substrates (3, 4) that oppose to each other with a liquid crystal layer 2 containing a liquid crystal variable in an aligned state interposed therebetween; and a first polarization plate 5 and a second polarization plate 6 disposed with the opposite substrates interposed therebetween so that their absorption axes are orthogonal to each other, wherein a birefringent layer 7 is formed between the first polarization plate 5 and the second polarization plate 6 by polymerizing a polymerizable liquid crystal, with an optical axis thereof inclined to a thickness direction of the birefringent layer 7, and the optical axis of the birefringent layer 7 is inclined, with respect to a thickness direction of the birefringent layer 7, in a direction of an absorption axis of any one of the first polarization plate 5 and the second polarization plate 6.

13 Claims, 9 Drawing Sheets

LIQUID CRYSTAL DISPLAY DEVICE

TECHNICAL FIELD

The present invention relates to a liquid crystal display device provided with a birefringent layer.

BACKGROUND ART

A liquid crystal display device (LCD), having various advantages such as being easy to make thin and light, able to reduce the consumption power and difficult to cause flickers, is used in various fields such as televisions and medical equipment. On the other hand, in addition to a problem in that, depending on an angle by which a viewer sees a liquid crystal display screen, light leakage and gradation reversal phenomena are caused to result in a narrow viewing angle, there is a problem in that the irregular color is caused on a liquid crystal display screen or the contrast is deteriorated.

In order to overcome the problems, there has been proposed a liquid crystal display device provided with an optical element that controls a state of light exiting from a liquid crystal cell or light incident on a liquid crystal cell.

In that case, as an optical element, proposed is an optical element that uses, other than a film material obtained by uniaxially or biaxially stretching a triacetyl cellulose film, a layer in which liquid crystal molecules are aligned in a specified direction and fixed.

Patent document 1 proposes a viewing angle compensation film made of a nematic liquid crystal polymer of which an intrinsic refractive index value is positive when molecular chains are aligned in a normal line direction of a film surface. Patent document 1 discloses that the viewing angle compensation film is obtained in such a manner that a vertical alignment film is formed on a surface of a glass substrate or the like with an alkyl silicone-based or fluoroalkyl silicone-based surface treatment agent, a cell is prepared therefrom, and liquid crystal molecules are encapsulated in the cell to photopolymerize the liquid crystal molecules.

Patent document 2 proposes a method of producing a liquid crystal layer where a polymerizable liquid crystal compound is coated on a vertical alignment film formed on a substrate to thereby homeotropically align the liquid crystal compound. In the method, a long-chain alkyl dendrimer derivative is used as a forming agent of the vertical alignment film. Furthermore, Patent document 2 discloses that, according to the method, a film material provided with a homeotropically aligned liquid crystal layer is obtained and the film material may be used as an optical film such as a retardation film.

Patent document 3 proposes a method of producing a homeotropically aligned liquid crystal film, the method including coating on a substrate on which no vertical alignment film is disposed a side-chain type liquid crystal polymer that contains a monomer unit containing a liquid crystalline fragment side-chain and a monomer unit containing a non-liquid crystalline fragment side-chain, homeotropically aligning the liquid crystal polymer in a liquid crystal state, and then fixing the liquid crystal polymer with the aligned state maintained.

Patent document 4 proposes a method of producing a homeotropically aligned liquid crystal layer, the method including forming on a substrate on which no vertical alignment film is disposed a binder layer and an anchor coat layer from the substrate side, coating a side-chain type liquid crystal polymer on the anchor coat layer to homeotropically align the side-chain type liquid crystal polymer, and then fixing the side-chain type liquid crystal polymer with the homeotropically aligned state maintained. In the method, as the side-chain type liquid crystal polymer, one that may form a homeotropically aligned liquid crystal layer on a substrate on which no vertical alignment film is disposed is used.

Patent document 1: Japanese Patent Application Laid-Open No. 05-142531

Patent document 2: Japanese Patent Application Laid-Open No. 2002-174724

Patent document 3: Japanese Patent Application Laid-Open No. 2002-174725

Patent document 4: Japanese Patent Application Laid-Open No. 2003-121852

DISCLOSURE OF THE INVENTION

Problems to be Solved by the Invention

However, the viewing angle compensation film of Patent document 1 is obtained after a series of processes in which two substrates having an alignment film are used to prepare a cell, liquid crystal molecules are encapsulated in the vacant cell, the liquid crystal molecules are vertically aligned, and, with the state maintained, the liquid crystal molecules are photo-polymerized with each other. Since the viewing angle compensation film of Patent document 1 is obtained only after many processes like this, there is a problem in that the production cost is considerably increased. Furthermore, the viewing angle compensation film is a film material, and thus when such a film is applied to a liquid crystal display device, an adhesive has to be used for fixing. Accordingly, in order to heighten the contrast of a liquid crystal screen of a liquid crystal display device, a special adhesive has to be selected as the adhesive.

In the method of Patent document 2, when a vertical alignment film is disposed on a substrate to obtain a homeotropically aligned liquid crystal layer, it is necessary to use a special material called a long-chain alkyl dendrimer derivative. As a result, when a homeotropically aligned liquid crystal layer is obtained according to the method, there is a problem in that the production cost is considerably increased.

A homeotropically aligned liquid crystal film obtained according to the method described in Patent document 3 is made of a side-chain type liquid crystal polymer and, even when it is fixed in a homeotropically aligned state, the fluidity is increased as a temperature is increased, to readily thermally affect on the birefringent characteristics. For this reason, a temperature range in which desired birefringent characteristics are maintained is relatively narrow and the orientation of liquid crystal polymers of a portion where liquid crystal polymers are fixed tends to be irregular. As a result, a homeotropically aligned liquid crystal film obtained according to the method is difficult to use in a liquid crystal display device demanded to be highly heat-resistant, which results in limitation of liquid crystal display devices to which the liquid crystal film may be used. Furthermore, according to the method, there is a problem similar to that of the method described in Patent document 1.

Moreover, when a homeotropically aligned liquid crystal film obtained according to the method is used in a liquid crystal display device, the film is necessary not to be placed under a high temperature environment, and accordingly, it is difficult to dispose the film inside of the liquid crystal display device. Therefore, there is a problem as well in that the homeotropically aligned liquid crystal film obtained according to the method of Patent document 3 is restricted in a position where the liquid crystal cell is disposed.

Since a homeotropically aligned liquid crystal film obtained according to the method described in Patent document 4 is made of a side-chain type liquid crystal polymer, there is a problem similar to that in the method described in Patent document 3. The method also has a problem similar to that described in Patent document 1.

Furthermore, when a homeotropically aligned liquid crystal film obtained according to any one of the methods described in Patent documents 1 to 4 is disposed on a liquid crystal display device to try to enlarge a viewing angle of a liquid crystal screen, such a film has to be adhered as a separate body by newly using an adhesive material or the like in the liquid crystal display device. The larger the necessity to add a separate body becomes, the larger fear to dispose a member that irregularly scatters light in any way is. As a consequence, in the liquid crystal display device, there is a large possibility that color irregularity becomes more conspicuous in a liquid crystal display screen and the contrast is deteriorated.

Still furthermore, in such a homeotropically aligned liquid crystal film, an attempt is made to fix and maintain liquid crystal molecules in a homeotropically aligned state by applying some method such as a polymerization reaction to the liquid crystal molecules. However, when, with liquid crystals substantially completely homeotropically aligned, the liquid crystals are fixed, it is difficult to maintain the homeotropically aligned state, which poses a problem in that liquid crystal molecules take an aligned state that has a tilt to the homeotropically aligned state.

In such a case, a homeotropically aligned liquid crystal film has an optical axis inclined to a thickness direction of the film surface and causes light leakage during black display of a liquid crystal display screen.

In this connection, extensive studies have made on a liquid crystal display device that, even when a birefringent layer in which liquid crystals are completely homeotropically aligned is not formed, inhibits the light leakage of a liquid crystal display screen from occurring to enable black display, suppresses the color irregularity from occurring and improves the contrast, whereby the invention came to completion.

The invention intends to provide a liquid crystal display device that, even when liquid crystals are fixed without completely maintaining a homeotropically aligned state, may effectively suppress the light leakage from occurring.

Means for Solving the Problems

A liquid crystal display device of the invention is a liquid crystal display device comprising: substrates that oppose to each other with a liquid crystal layer containing a liquid crystal variable in an aligned state interposed therebetween, and a first polarization plate and a second polarization plate disposed with the opposite substrates interposed therebetween so that their absorption axes are orthogonal to each other; and a birefringent layer is formed between the first polarization plate and the second polarization plate by polymerizing a polymerizable liquid crystal, with an optical axis thereof inclined to a thickness direction of the birefringent layer; wherein the optical axis of the birefringent layer is inclined, with respect to the thickness direction of the birefringent layer, in a direction of an absorption axis of any one of the first polarization plate and the second polarization plate.

In the liquid crystal display device of the invention, the birefringent layer may be formed by polymerizing a polymerizable liquid crystal in a homeotropically aligned state. Alternatively, the birefringent layer may be formed by three-dimensionally crosslinking and polymerizing a polymerizable liquid crystal having a bar-like molecular shape.

In the liquid crystal display device of the invention, the optical axis of the birefringent layer may be uniformly inclined over an entire surface of the birefringent layer.

In the liquid crystal display device of the invention, the birefringent layer may be laminated and formed between the opposite substrates.

In the liquid crystal display device of the invention, a colored layer may be formed on at least one of the opposite substrates, and the birefringent layer may be formed on a surface of the colored layer.

In the liquid crystal display device of the invention, the colored layer includes colored pixels that are disposed in a stripe layout pattern and allow light having a specified wavelength to transmit, and a direction of the absorption axis of any one of the first polarization plate and the second polarization plate may coincide with a longitudinal direction of the stripe type colored pixels.

In the liquid crystal display device of the invention, a different birefringent layer having an optical axis different from that of the birefringent layer having an inclined optical axis may be formed between the birefringent layer having an inclined optical axis and the first polarization plate.

In the liquid crystal display device of the invention, the birefringent layer having an inclined optical axis may be formed between the substrate on which a colored layer is formed and a liquid crystal layer, and a different birefringent layer having an optical axis different from that of the birefringent layer having an inclined optical axis may be formed between the substrate on which a colored layer is formed and the first polarization plate.

In the liquid crystal display device of the invention, a different birefringent layer having an optical axis different from that of the birefringent layer having an inclined optical axis may be formed between the birefringent layer having an inclined optical axis and the first polarization plate, and an optical axis of the different birefringent layer may coincide, in a direction, with a direction of the absorption axis of the first polarization plate or the second polarization plate.

In the liquid crystal display device of the invention, a different birefringent layer having an optical axis different from that of the birefringent layer having an inclined optical axis may be disposed between the birefringent layer having an inclined optical axis and the first polarization plate and formed between the substrate on which a colored layer is formed and a liquid crystal layer, and an optical axis of the different birefringent layer may coincide, in a direction, with a direction of the absorption axis of the first polarization plate or the second polarization plate.

According to the liquid crystal display device of the invention, the different birefringent layer may be provided with a film material.

Effect of the Invention

According to the liquid crystal display device of the invention, an optical axis of a birefringent layer is inclined, with respect to a thickness direction thereof, to a direction of an absorption axis of a first polarization plate or a second polarization plate. Thus, even when, in a birefringent layer formed by polymerizing a polymerizable liquid crystal, a state of the polymerizable liquid crystal is in an incompletely homeotropically aligned state, light may be inhibited from leaking in a thickness direction of the birefringent layer at the time of black display, and the front contrast may be inhibited from deteriorating.

According to the liquid crystal display device of the invention, when a polymerizable liquid crystal is polymerized on a substrate to form a birefringent layer, there is no need of producing a birefringent layer as a separate body and adhering it with an adhesive. Consequently, interfacial reflection of light caused by multi-layering due to existence of a layer of an adhesive or the like may be reduced and thereby the front contrast may be inhibited from deteriorating. Furthermore, in the liquid crystal display device, since a birefringent layer may be formed by three-dimensionally crosslinking and polymerizing a polymerizable liquid crystal, a structure of the birefringent layer may be more strengthened. Still furthermore, according to the liquid crystal display device of the invention, the birefringent layer may be formed by crosslinking and polymerizing a thermotropic liquid crystal that is polymerizable with irradiation of UV-ray. In this case, the orientation of a liquid crystal that forms a birefringent layer becomes thermally affected with difficulty, so that a liquid crystal display device is formed that is applicable to an optical device to be used under an environment that tends to be relatively high temperatures such as in a car.

According to the liquid crystal display device of the invention, an aligned state where polymerizable liquid crystal molecules are uniformly inclined is formed, that is, optical axes of the birefringent layer are uniformly inclined over an entire surface of the birefringent layer. With this configuration, the difference in the capability of suppressing the light leakage in a thickness direction of the birefringent layer becomes difficult to occur due to the difference of positions on the surface of the birefringent layer, and accordingly, the light leakage from the liquid crystal display device may be evenly inhibited from occurring.

According to the liquid crystal display device of the invention, a birefringent layer is laminated and formed between opposite substrates. Therefore, when a liquid crystal display device is assembled, fear of collision of the polarization plates with the birefringent layer may be suppressed in a process of arranging polarization plates, etc. so as to sandwich the substrates, which enables suppression of fear of damaging the birefringent layer.

In some cases, the liquid crystal display device of the invention is formed by laminating a colored layer on at least one of the opposite substrates, followed by laminating and forming a birefringent layer on a surface of the colored layer. According to such a liquid crystal display device, there is no need of laminating and forming a birefringent layer as a separate retardation film or the like with an adhesive, that is, without forming a layer such as an adhesive layer between the colored layer and the birefringent layer, a liquid crystal display device may be formed. Accordingly, the number of interfaces between different members such as interfaces between the retardation film and a layer of an adhesive may be reduced, which results in suppression of fear of generating the interfacial reflection of light propagating between the colored layer and the birefringent layer.

According to the liquid crystal display device of the invention, when a stripe type is adopted as a layout pattern of colored pixels and a direction of an absorption axis of the polarization plate is aligned in a longitudinal direction of colored pixels, which may be readily visually conceived, it is possible to cause a tilt direction of an optical axis of the birefringent layer to coincide with an absorption axis of any one of the first polarization plate and the second polarization plate certainly and efficiently with ease. As a result, an efficiently produced liquid crystal display device may be obtained.

According to the liquid crystal display device of the invention, a different birefringent layer having an optical axis different from that of the birefringent layer having an inclined optical axis is formed between the birefringent layer having an inclined optical axis and the first polarization plate. Consequently, for example, with a different birefringent layer as a so-called +A plate and the birefringent layer as a so-called +C plate, a layer structure exerting a different optical compensation function may be formed. As a result, the optical compensation function for efficiently reducing the light leakage from the liquid crystal display device may be effectively exerted.

According to the liquid crystal display device of the invention, the birefringent layer having an inclined optical axis is formed between a substrate on which a colored layer is formed and a liquid crystal layer, and a different birefringent layer having an optical axis different from that of the birefringent layer having an inclined optical axis is formed between a substrate on which a colored layer is formed and the first polarization plate. Thereby, since a different birefringent layer is formed between the substrate on which the colored layer is formed and the first polarization plate to be able to form a so-called +A plate and a birefringent layer is formed between the substrate on which the colored layer is formed and the liquid crystal layer to be able to form a so-called +C plate, it is possible to effectively reduce the light leakage from the liquid crystal display device.

According to the liquid crystal display device of the invention, since an optical axis of a different birefringent layer coincides in a direction with a direction of the absorption axis of the first polarization plate or the second polarization plate, the optical compensation function for efficiently reducing the light leakage from the liquid crystal display device may be more effectively exerted.

According to the liquid crystal display device of the invention, since a different birefringent layer is constituted to include a film material, it becomes easy to separately add a different birefringent layer to be disposed as needs arise.

EXPLANATION OF REFERENCE NUMERALS

Figure 1:
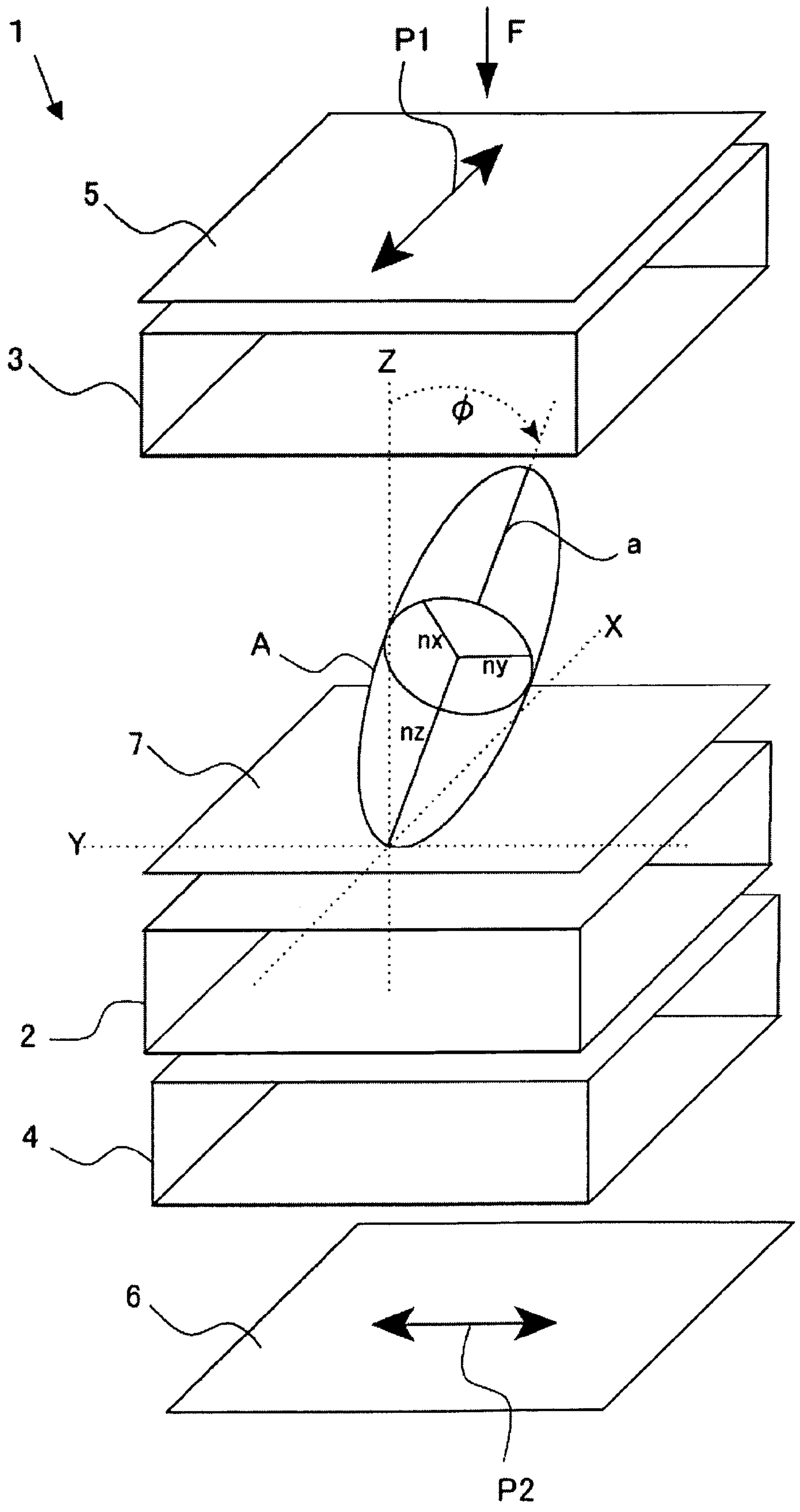
FIG. 1 is an exploded explanatory view for explaining a structure of a liquid crystal display device of the invention.

1: Liquid crystal display device
2: Liquid crystal layer
3: First substrate
4: Second substrate
5: First polarization plate
6: Second polarization plate
7: Birefringent Layer
8: Colored Pixel
9: Light-shielding portion
10: Colored layer
20: Switching circuit
30: Base material
31: Different birefringent layer

BEST MODE FOR CARRYING OUT THE INVENTION

A liquid crystal display device of the invention (hereinafter, referred to as a first mode liquid crystal display device) will be described in detail.

FIG. 1 is a schematic explanatory view for explaining a liquid crystal display device of the invention.

Figure 2A:
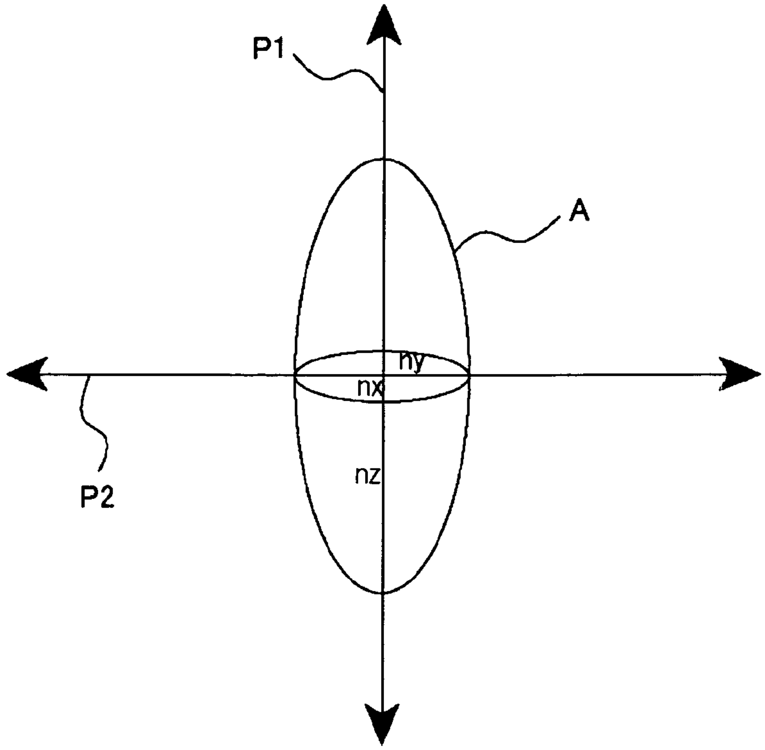
FIG. 2A is an explanatory diagram for explaining a relationship between an absorption axis and a refractive index ellipse as seen from an F direction in FIG. 1 in an example of the liquid crystal display device of the invention.

FIG. 2A is a schematic explanatory diagram for explaining a relationship between directions of absorption axes of polarization plates and a refractive index ellipse of a birefringent layer in the liquid crystal display device of the invention when seen in an F direction of FIG. 1.

As an example of the first mode liquid crystal display device, a case where a birefringent layer is formed on one of opposite substrates will be described.

A liquid crystal display device 1 includes: a first substrate 3 and a second substrate 4 (hereinafter, in some cases, simply referred to as a substrate), which oppose to each other with a liquid crystal layer 2 (in some cases, referred to as a driving liquid crystal layer) interposed therebetween; a first polarization plate 5 and a second polarization plate 6 that are disposed with the first substrate 3 and second substrate 4 interposed therebetween (on an outer surface of the substrate); and a birefringent layer 7 that is formed between the first polarization plate 5 and the second polarization plate 6.

An inside surface and an outside surface in the liquid crystal display device are, when an internal-to-external direction is taken as a direction from a near portion to a far portion of the liquid crystal layer 2, an inside surface and an outside surface assigned according to a definition of the internal-to-external direction.

The first substrate 3 and second substrate 4 each are provided with a layer made of an optically transparent base material, and may be constituted in a structure made of a single base material layer, a multi-layer structure obtained by stacking a plurality of base materials or a laminate where a functional layer having a predetermined function is laminated on a layer made of a base material. The substrate may be provided with a functional layer on each of both sides of the base material or on one side of the base material.

The light transmittance of the base material may be appropriately selected. Further, a light-shielding region or the like may be partially formed on the base material.

As the base material, other than a glass substrate (glass material), planar bodies made of various materials may be appropriately selected. Specific examples thereof include nonflexible members (rigid materials) such as quartz glass, borosilicate glass and synthesized quartz, and flexible members (flexible materials) such as a resin film and a resin plate.

When a base material is used in a liquid crystal display device, the base material is preferably alkali-free glass.

When the base material is a member that uses a resin such as a resin film or a resin plate, specific examples of the resin used in the base material include thermoplastic polymers including a polycarbonate polymer, a polyester polymer such as polyalylate or polyethylene terephthalate (PET), a polyimide polymer such as polyimide or polyamideimide, a polysulfone polymer, a polyether sulfone polymer, a polystyrene polymer, a polyolefin polymer such as polyethylene or polypropylene, a polyether ketone polymer, a polyvinyl alcohol polymer, a cellulose acetate polymer, a polyvinyl chloride polymer and a polymethyl methacrylate polymer; a triacetyl cellulose (TAC) film; and a liquid crystal polymer.

Furthermore, as the base material, one obtained by monoaxially stretching or bi-axially stretching a resin film made of the resin described above may be used.

In this case, the resin film is preferably a film made of polyethylene terephthalate because the stretching multiplication factor is wide in the range and it is readily available.

A functional layer is a layer having a function of varying a state of light and is different from the birefringent layer 7 in constitution. Specific examples thereof include a colored layer, a layer made of a cholesteric liquid crystal in which the orientation of the liquid crystal is fixed, a reflective plate that reflects light and a polarization plate. Furthermore, the functional layer may be disposed not only entirely on a surface of a base material but also partially on the surface of the base material.

In addition, the functional layer may be an alignment film such as a horizontal alignment film in which liquid crystal molecules constituting the liquid crystal layer 2 are horizontal alignment film or a vertical alignment film in which liquid crystal molecules are vertically aligned.

Polyimide, polyamide, polyvinyl alcohol and so on are usually used as the alignment film. Polyimide, when used as an alignment film, preferably has a long-chain alkyl group because when liquid crystal molecules are fixed to form a birefringent layer on a substrate, a thickness of a birefringent layer may be selected in a wide range.

The alignment film may be formed in such a manner that a film composition liquid constituting the alignment film is prepared, the film composition liquid is coated on a substrate surface by means of a flexo printing method or a spin coat method to form a coating film, and the coating film is cured. Specific examples of the film composition liquids, for example, ones that contain polyimide, include SE-7511 and SE-1211 (trade name, produced by Nissan Chemical Industries, Ltd.), JALS-2021-R2 (trade name, produced by JSR Co., Ltd.), QL and LX-series (trade name, produced by Hitachi-DuPont Microsystem Ltd.) and Lixon Aligner (trade name, produced by Chisso Corporation).

A film thickness of an alignment film is preferably substantially in the range of 0.01 to 1 μm. When the film thickness of the alignment film is less than 0.01 μm, it may be difficult to impart desired alignment to a liquid crystal contained in a layer in contact with the alignment film, such as a birefringent layer. Alternatively, when the film thickness of the alignment film is thicker than 1 μm, there is fear in that the alignment film per se irregularly reflects light to largely deteriorate the light transmittance of the liquid crystal display device.

Figure 2B:
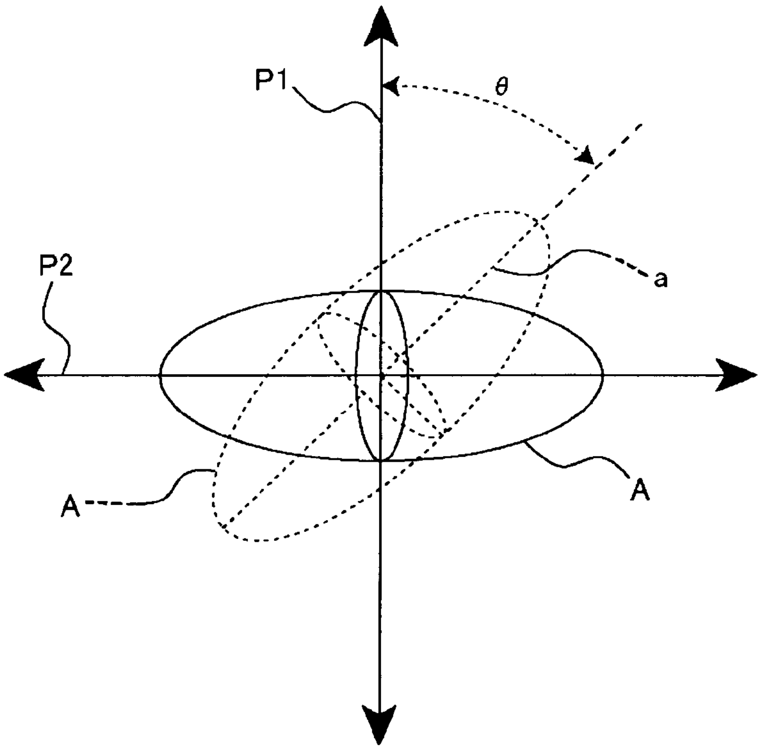
FIG. 2B is an explanatory diagram for explaining a relationship between an absorption axis and a refractive index ellipse as seen from an F direction in FIG. 1 in another example of the liquid crystal display device of the invention.

The first polarization plate 5 and the second polarization plate 6 (in some cases, simply referred to as a polarization plate) are disposed, as shown in FIGS. 1, 2A and 2B, so that absorption axes P1 and P2 of the polarization plates 5 and 6 are orthogonal to each other when the polarization plates 5 and 6 are seen in a thickness direction of the birefringent layer 7 (when seen in a direction of an arrow F in FIG. 1). In this case, transmission axes of the polarization plates 5 and 6, respectively, are formed vertically intersecting with the absorption axes P1 and P2 on surfaces of the polarization plates. That is, the first polarization plate 5 and the second polarization plate 6 are disposed in cross Nicol.

In FIG. 1, the birefringent layer 7 is formed between the first substrate 3 and the liquid crystal layer 2.

The birefringent layer 7 has a polymer structure where polymerizable liquid crystal molecules having a slightly slender molecular shape (in some cases, referred to as a polymerizable liquid crystal) are homeotropically aligned and, in this state, the liquid crystal molecules are polymerized with each other. In this case, the polymer structure may form a three-dimensional structure (crosslinking polymer structure) by crosslinking and polymerizing polymerizable liquid crystal molecules.

As the polymerizable liquid crystal, any one of monomer, oligomer and polymer of polymerizable liquid crystal may be used and these may be appropriately used in combination.

In a crosslinking polymer structure of the birefringent layer 7, the degree of crosslinking of liquid crystal molecules is preferably substantially 80 or more and more preferably substantially 90 or more. When the degree of crosslinking of the liquid crystal molecules is less than 80, uniform orientation may not be sufficiently maintained.

The birefringent layer 7 has the birefringent characteristics in accordance with the refractive index anisotropy of a liquid crystal molecule constituting the birefringent layer 7 and an aligned state thereof, and the birefringent characteristics of the birefringent layer 7 are specified in accordance with a state of an refractive index ellipse A by use of the refractive index ellipse A (FIG. 1).

The state of the refractive index ellipse A can be specified at the respective positions on the surface of the birefringent layer 7. The state of the refractive index ellipse A that expresses the birefringent characteristics in the birefringent layer 7 is specified as a substantial average state of the states of the refractive index ellipse A specified to previously selected respective positions of the birefringent layer 7.

For example, an average state of the refractive index ellipse A is specified in such a manner that a plurality of different positions on a surface of a birefringent layer are selected as positions to be measured of states of a refractive index ellipse (measuring positions) and states of the refractive index ellipse A at the respective measurement positions are measured and averaged.

Here, the state of the refractive index ellipse A is shown with a shape of the refractive index ellipse A and a tilt state of the refractive index ellipse A.

With a z-axis (shown by z in FIG. 1) adopted in a thickness direction of the birefringent layer 7 and with, on a plane that has a z-axis as a normal line, an x-axis and a y-axis (shown respectively by x and y in FIG. 1) disposed so as to intersect orthogonally to each other and so as to intersect with the z-axis, a space assigned by the x-axis, y-axis and z-axis is considered. The shape of the refractive index ellipse A is specified as an ellipse corresponding to values of the refractive indices (shown by nx, ny and nz in FIG. 1) in the space. Assuming that a birefringent layer has optical axes of liquid crystal molecules constituting the birefringent layer 7 aligned in parallel with a z-axis direction (aligned), the refractive indices nx, ny and nz are assigned as the refractive indices of light in the respective directions of the x-axis, y-axis and z-axis in the assumed birefringent layer. In the space, the x-axis and y-axis are assigned so as to respectively overlap (aligned in a direction) with the absorption axes P1 and P2 of the polarization plates 5 and 6 when seen from a z-axis direction.

A tilt state of the refractive index ellipse A in the space is specified by a tilt state of a major axis "a" thereof (showing an optical axis), and the tilt state of the major axis "a" is specified by a tilt angle (shown by $\phi$ in FIG. 1) and an azimuthal angle (shown by $\theta$ in FIG. 2B). Here, the tilt angle $\phi$ is an angle that is formed between the major axis "a" of the refractive index ellipse A and the z-axis. Furthermore, an azimuthal angle $\theta$ expresses, when a value of the tilt angle $\phi$ is other than zero, an angle of rotation necessary for overlapping the major axis "a" with the x-axis (absorption axis P1 of the first polarization plate 5) by rotating the refractive index ellipse A in an anti-clockwise direction around the z-axis while seeing the major axis "a" in a direction (in an F direction) from the first polarization plate 5 to the second polarization plate 6 in the z-axis direction.

The birefringent layer 7 is ideally 0 (zero) in a value of the tilt angle $\phi$ of the refractive index ellipse A. However, in many cases, liquid crystal molecules incline relative to a thickness direction (the z-axis direction in FIG. 1) in the birefringent layer 7. In such a case, the birefringent layer 7 takes a value other than zero in the tilt angle $\phi$, that is, has an optical axis inclined relative to the thickness direction thereof.

In the case where the tilt angle $\phi$ of the birefringent layer 7 takes a value other than zero, the major axis "a" (optical axis) of the refractive index ellipse A of the birefringent layer 7 is, when seen in the thickness direction thereof, directed (aligned) in a direction same as a direction of any one of the absorption axes P1 and P2 of the first polarization plate 5 and second polarization plate 6 (FIGS. 2A and 2B). That is, a substantial value of the azimuthal angle $\theta$ of the major axis "a" in the refractive index ellipse A of the birefringent layer 7 is any one of 0°, 90°, 180° and 270°.

The birefringent layer 7 is capable of generating retardation to light (incident light) incident to the birefringent layer 7 in accordance with the birefringent characteristics thereof. The retardation is an optical path difference between ordinary light and extraordinary light generated to incident light. Assuming that a refractive index of ordinary light is no and a refractive index of extraordinary light is ne, a magnitude of the retardation (retardation value) is given as a product of the birefringence $\Delta n$ (difference between no and ne) and d (a film thickness of the birefringent layer 7). Here, a correspondence relationship between values of no and ne and values of nx, ny and nz is no=nx=ny and ne=nz.

Accordingly, when a kind of liquid crystal molecules, a degree of alignment of the liquid crystal molecules, a film thickness of the birefringent layer 7 and the like are appropriately selected to control the birefringent characteristics, a magnitude of the retardation in the birefringent layer 7 is controlled corresponding thereto.

The magnitude of the retardation may be measured by use of a commercially available measurement unit such as RETS-1250VA (trade name, produced by Ohtsuka Denshi K. K.) or KOBRA-21 (trade name, produced by Oji Scientific Instruments). In this case, incident light having a specified wavelength is irradiated on a birefringent layer to measure the retardation. The measurement wavelength is preferably in a visible region (380 to 780 nm) and particularly preferably in the proximity of 550 nm where the visible sensitivity is the largest.

From the viewpoint of obtaining the birefringent layer 7 in which liquid crystal molecules are made to be close to amore uniformly homeotropically aligned state, the magnitude of the retardation in the birefringent layer 7 is preferably 1 nm or less, more preferably 0.1 nm or less and ideally preferably zero.

A film thickness of the birefringent layer 7 is preferably appropriately selected within a range where liquid crystal molecules are homeotropically aligned, specifically within a range where the retardation in the thickness direction is 1 nm or less and more preferably within a range where the retardation is substantially 0.1 nm or less.

Tilt states of the refractive index ellipse at mutually different positions on the surface of in the birefringent layer 7 are preferably substantially same, that is, the tilt states of the refractive index ellipse are preferably less in the dispersion. Specifically, the dispersion of the tilt angles of the refractive index ellipse at the respective positions is preferably in the range of substantially 2°. In such a case, a liquid crystal display device shows a little irregularity in the light leakage when it is seen from a direction other than a front direction (F direction) during black display, and, even during other than black display, generates irregularity in the optical compensation. However, when the range of the dispersion exceeds 2°, there is fear that such an irregularity may be an extent that is visibly observed.

When the birefringent layer 7 is formed on a vertical alignment film, liquid crystal molecules contained in the birefringent layer 7, when positioned close to the vertical alignment film, become a strongly homeotropically aligned state (substantially 0 in the tilt angle ϕ). Alternatively, when liquid crystal molecules are positioned far from the vertical alignment film, the homeotropic alignment becomes weak. Accordingly, when liquid crystal molecules positioned far from the vertical alignment film as well are strongly homeotropically aligned, tilt angles of the liquid crystal molecules in the birefringent layer 7 are uniformized, whereby a state where liquid crystal molecules are uniformly homeotropically aligned is obtained.

In the birefringent layer 7, as to the tilt angle of a liquid crystal molecule that is a unit for constituting a crosslinked polymer structure, the tilt angle of a liquid crystal molecule positioned closest to a boundary surface with a vertical alignment film of the birefringent layer 7 and the tilt angle of a liquid crystal molecule positioned farthest in a thickness direction of the birefringent layer from the liquid crystal molecule positioned closest to a boundary surface in a thickness direction of the birefringent layer are preferred to be substantially equal to each other. In this case, the tilt angles of the respective liquid crystal molecules in the birefringent layer 7 become substantially equal in the thickness direction. In such a case, the birefringent characteristics of the birefringent layer 7 are readily uniformized in its plane direction, and accordingly, the suppression capability of the light leakage is readily inhibited from fluctuating.

Furthermore, the tilt angles of liquid crystal molecules in the birefringent layer 7 are preferred to be respectively equal in a plane direction thereof and more preferred to be equal over an entire surface of the birefringent layer 7. In such a case, states of the refractive index ellipse A become substantially same at different positions on the surface of the birefringent layer 7, and accordingly, the birefringent characteristics of the birefringent layer 7 become uniform in the plane direction. That is, optical axes of the birefringent layer 7 are substantially same irrespective of positions on the surface of the birefringent layer 7. As a result, the suppression capability of the light leakage corresponding to positions on the surface of the birefringent layer 7 is more inhibited from fluctuating.

Furthermore, in the birefringent layer 7, the azimuthal angle θ of an optical axis of the birefringent layer 7 takes a value of any one of substantially 0°, 90°, 180° and 270° as mentioned above. Examples of such a case include a case where azimuthal angles of optical axes of the individual liquid crystal molecules contained in the birefringent layer 7 evenly take any one of substantially 0°, 90°, 180° and 270° irrespective of positions thereof (first case) and a case where azimuthal angles of optical axes of liquid crystal molecules take, as to liquid crystal molecules different in the positions, different values from each other of any one of substantially 0°, 90°, 180° and 270° (a case where azimuthal angles are partially different in levels of liquid crystal molecules of the birefringent layer 7) and, when the birefringent layer 7 is considered as a whole, an azimuthal angle θ of an optical axis takes a value of any one of the above values (second case). The birefringent layer 7 may be one corresponding to the first case or the second case, and preferable is one corresponding to the first case.

Furthermore, in whatever case of the first case and the second case, the dispersion of the tilt states of optical axes of liquid, crystal molecules is preferred to be small relative to each value of the substantially 0°, 90°, 180° and 270°. Specifically, as to the azimuthal angles of the liquid crystal molecules, the width of the dispersion thereof is preferred to be in a range of 2°. In the first case, a case where the azimuthal angles of the optical axes of the liquid crystal molecules are evenly substantially 0° is taken as an example. Even when plural positions are selected as positions of liquid crystal molecules of the birefringent layer 7, the azimuthal angles of the optical axes of the liquid crystal molecules at all positions thereof are preferred to be within 2° around 0°. Furthermore, in the second case, when the major axis "a" of the refractive index ellipse A of the birefringent layer 7 takes a direction same as a direction of the absorption axis P1 of the first polarization plate 5, a substantial value of the azimuthal angle of the optical axis of the liquid crystal molecule takes any one of 0° and 180°, while when the major axis "a" of the refractive index ellipse A of the birefringent layer 7 takes a direction same as a direction of the absorption axis P2 of the second polarization plate 6, a substantial value of the azimuthal angle of the optical axis of the liquid crystal molecule is 90° or 270°, and the azimuthal angle is preferred to be within 2° around the respective values. For example, assume that, in the second case, the azimuthal angles of the liquid crystal molecules are combinations of 0° and 180°. Even when plural positions of the liquid crystal molecules in the birefringent layer 7 are selected, the azimuthal angles of the optical axes of the liquid crystal molecules at all the positions are preferred to be within a range of 2° around 0° and 2° around 180°.

The state of the optical axis of the birefringent layer 7 can be defined as mentioned above as a substantially average state of states of optical axes specified to every positions previously selected on the surface of the birefringent layer 7 (average values of values of ϕ, θ and so on that specify a state of an optical axis). However, when the tilt states of the optical axes of the birefringent layer 7 at different positions on the surface of the birefringent layer 7 are substantially same, a tilt state of an optical axis measured at one position on the surface of the birefringent layer 7 may express a tilt state of an optical axis of the birefringent layer 7.

Also, as to tilt states of optical axes of liquid crystal molecules at different positions in the birefringent layer 7, when average states of tilt states of the optical axes (states of optical axes determined by a tilt angle, an azimuthal angle and the refractive index) are determined, tilt states of optical axes of liquid crystal molecules of the birefringent layer 7 can be defined by the determined states. Specifically, when a case where the azimuthal angles of the optical axes of the liquid crystal molecules contained in the birefringent layer 7 take values of two kinds of 0° and 180° selected from 0°, 90°, 180° and 270° is taken as an example, the tilt states of the optical axes of the liquid crystal molecules of the birefringent layer 7 are specifically defined as in states obtained by combining 0° and 180° of the azimuthal angles.

As a liquid crystal molecule that constitutes the birefringent layer 7, one that has an unsaturated double bond in a molecular structure and is crosslinkable in a liquid crystal state is used. Accordingly, as a polymerizable liquid crystal, one that has an unsaturated double bond at an end of a molecule is used.

viewpoint of the heat resistance, a compound capable of three-dimensionally crosslinking is preferred, and a compound having at least two unsaturated double bonds at an end of a molecule is used.

Still furthermore, as the liquid crystal molecule that constitutes the birefringent layer 7, plural kinds of compounds represented by the following chemical formulas (Chem 1) to (Chem 11) may be selected.

[Chem 1]

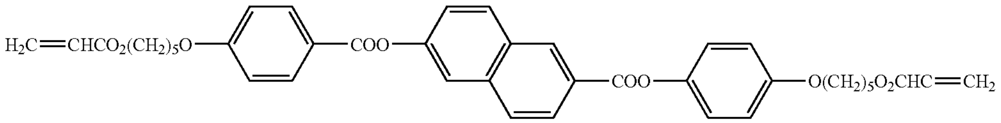

[Chem 2]

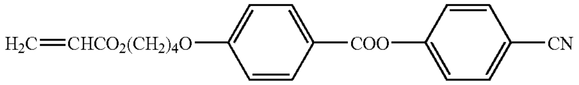

[Chem 3]

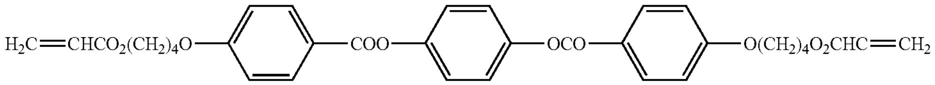

[Chem 4]

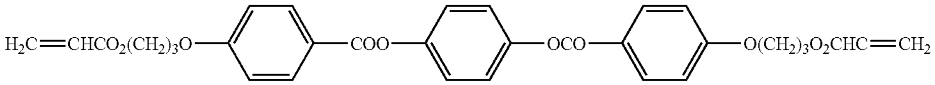

[Chem 5]

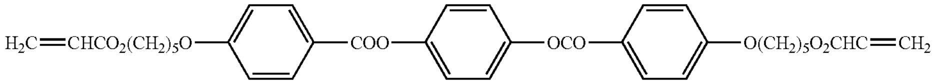

[Chem 6]

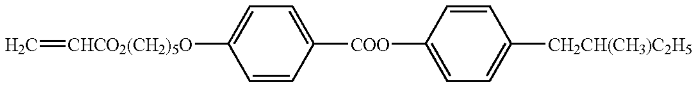

[Chem 7]

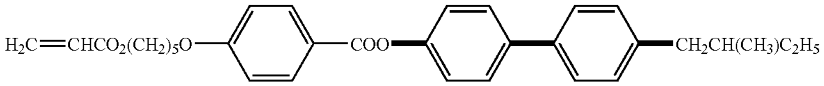

[Chem 8]

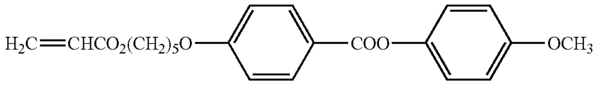

[Chem 9]

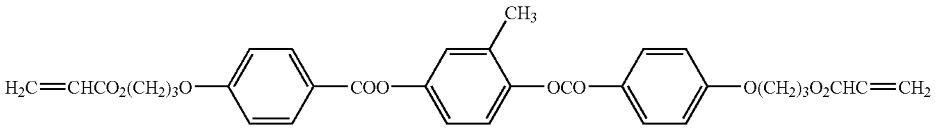

[Chem 10]

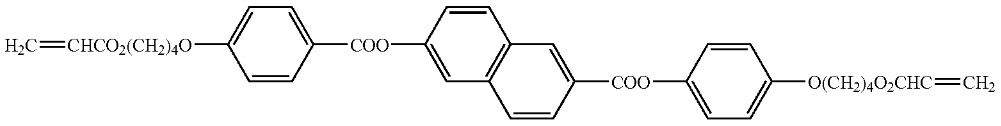

[Chem 11]

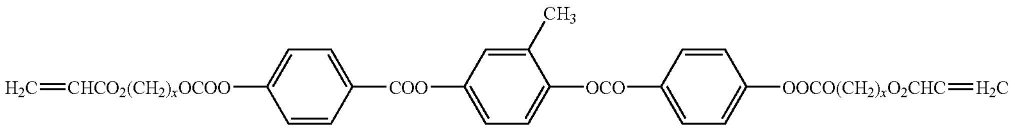

Furthermore, a liquid crystal molecule is preferred to be substantially 0.03 to 0.20 in the birefringence Δn and more preferred to be substantially 0.05 to 0.15. Compounds represented by formulas 1 to 11 below may be exemplified as specific examples of such liquid crystal molecules. From the (Here, X Denotes an Integer from 4 to 6.)

Without restricting to a case where liquid crystal molecules are polymerized and formed over an entire surface of a vertical alignment film, the birefringent layer 7 may be configured such that liquid crystal molecules are pattern-formed through patterning on a vertical alignment film by use of various kinds of printing methods or a photolithography method.

In the liquid crystal display device of the invention, without restricting to a case where, as is shown in FIG. 1, the birefringent layer 7 is laminated and formed between the first substrate 3 and the liquid crystal layer 2, the birefringent layer 7 may be laminated and formed between the first substrate 3 and the first polarization plate 5 or between the second substrate and the second polarization plate 6, as far as it is formed between the first polarization plate 5 and the second polarization plate 6.

Furthermore, the birefringent layer 7 may be formed between opposite substrates (first and second substrates). Specifically, the birefringent layer 7 may be formed, other than between the first substrate 3 and the liquid crystal layer 2, between the second substrate and the liquid crystal layer 2.

When in the liquid crystal display device, the birefringent layer 7 is formed between the first substrate 3 and the liquid crystal layer 2 or between the second substrate 4 and the liquid crystal layer 2, the birefringent layer 7 can be inhibited from exposing on an outer surface of the first substrate. Accordingly, it is possible to inhibit the birefringent layer from being readily damaged in a process of adhering the polarization plates 5 and 6 to the substrates 3 and 4 to assemble a liquid crystal display device or when an operation force is applied from the outside at the time of use.

The liquid crystal layer 2 is formed by encapsulating a liquid crystal between the first substrate 3 on which the birefringent layer 7 is laminated and the second substrate 4.

The liquid crystal encapsulated in the liquid crystal layer 2 may be appropriately selected, and specific examples thereof include ZLI-2293 (trade name, produced by Merck Co., Ltd.).

In the liquid crystal that constitutes the liquid crystal layer 2, the aligned state is varied depending on an external electric field, and thereby, the liquid crystal display device is capable of controlling the retardation of light propagating in the liquid crystal layer.

Figure 4A:
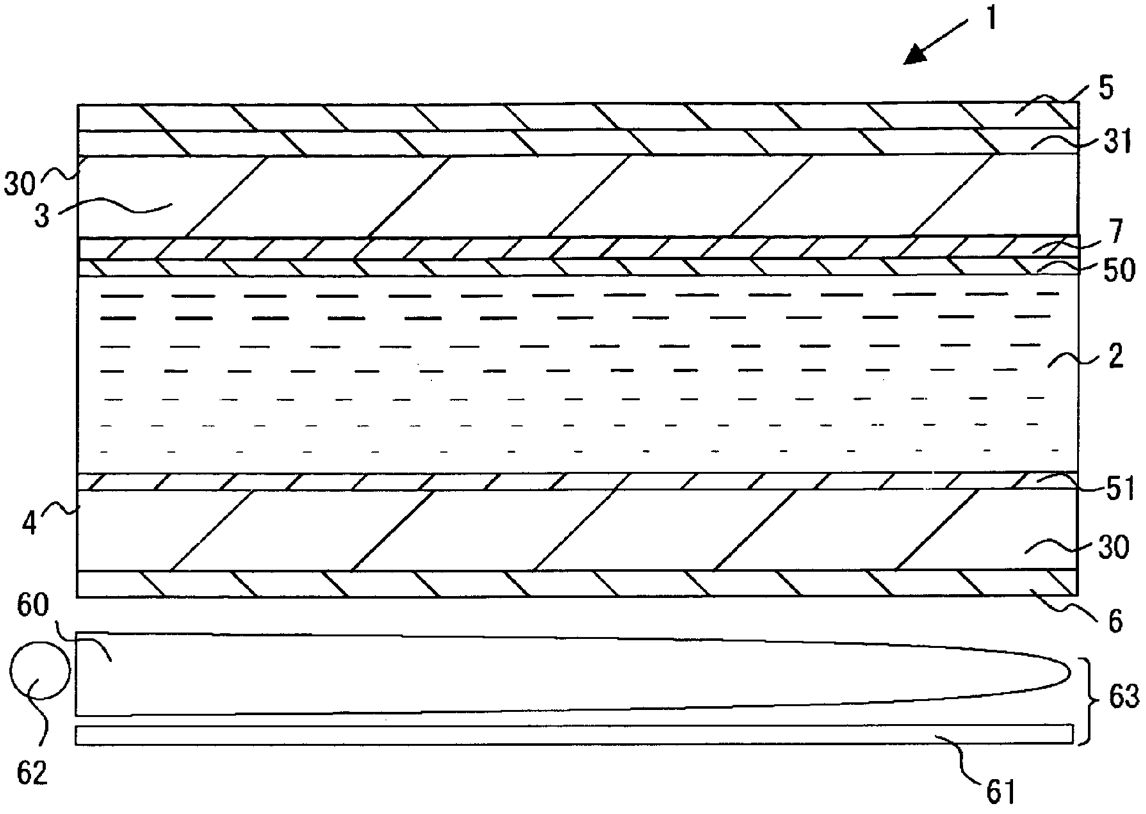
FIG. 4A is a schematic sectional view for explaining one example of a liquid crystal display device provided with a different birefringent layer.

In some cases, alignment films 50 and 51 are formed between the substrates 3 and 4 and the liquid crystal layer 2 so as to come into contact with interfaces of the liquid crystal layer 2 as shown in FIG. 4A. The alignment film is a horizontal alignment film for horizontally aligning liquid crystals of the liquid crystal layer 2 formed between the substrates 3 and 4 or a vertical alignment film for vertically aligning the liquid crystals. Which one of the horizontal alignment film and the vertical alignment film is used as an alignment film is appropriately selected.

For example, to cause light to be incident in a direction toward a direction of the first substrate 3 from the second substrate 4, the liquid crystal display device may be provided with a light illumination portion 63 that includes a light source 62, a light guide plate 60 that guides light emitted from the light source 62 while diffusing it in a plane direction of the second polarization plate 6, and a light reflection plate 61 that propagates light guided by the light guide plate 60 in a direction of the second substrate 4 (FIG. 4A). In this case, when light is incident from the light illumination portion 63 to the second polarization plate 6 and then passes through the second substrate 4 and the liquid crystal layer 2, light vibrating vertical to an absorption axis of the first polarization plate 5 is obtained. Furthermore, the light further transmits a colored layer 10, so that light having a predetermined wavelength is exited toward the outside of the first polarization plate 5.

In the liquid crystal display device of the invention, a birefringent layer having a structure where liquid crystal molecules are crosslinking polymerized is laminated on a substrate. Accordingly, a liquid crystal display device having relatively high heat resistance can be obtained at low cost. Furthermore, since a liquid crystal display device is produced without interposing a retardation control film separately produced to apply the optical compensation, the liquid crystal display device may be thinned. Still furthermore, since a sticking agent such as an adhesive, necessary to coat when a retardation control film material is interposed becomes unnecessary, the interfacial reflection accompanying a multilayer structure due to the presence of a layer such as an adhesive may be reduced. This enables to further improve the display characteristics of a liquid crystal display screen such as the contrast.

According to the liquid crystal display device, the birefringent layer has a structure where liquid crystals are crosslinking polymerized in a homeotropically aligned state. Accordingly, in the case where, when an xyz orthogonal coordinate system is assumed with a z-axis set in a thickness direction of the birefringent layer, a value of the tilt angle $\phi$ of the refractive index ellipse A is zero, a state may be obtained in which the refractive indices nx, ny and nz of the refractive index ellipse A, respectively, are in parallel with the x-axis direction, the y-axis direction and the z-axis direction, wherein the refractive index nx in the x-axis direction and the refractive index ny in the y-axis direction become substantially same in value, and the refractive index nz in the z-axis direction may be made larger than the refractive indices nx and ny.

Accordingly, in such a case, the birefringent layer 7 may be formed as a layer having the birefringent characteristics such hat the refractive indices satisfy $nz>nx=ny$, that is, a layer having an optical axis in a thickness direction (z-axis direction) thereof and the uniaxial birefringent characteristics. This enables the birefringent layer 7 to function as a so-called [+C plate], and thereby to function as a liquid crystal display device having a retardation control function capable of optically compensating the light retardation.

Furthermore, when a value of the tilt angle $\phi$ of the refractive index ellipse A in the liquid crystal display device takes a value other than zero, the azimuthal angle $\theta$ takes a value of any one of substantially 0°, 90°, 180° and 270°.

Here, when the azimuthal angle $\theta$ takes a value other than these values, the major axis "a" (optical axis) does not overlap with any one of the absorption axis P1 and the absorption axis P2 as shown with a broken line in FIG. 2B when seen from the z-axis direction (when seen from the arrow F direction in FIG. 1). As a result, the retardation is imparted to light that transmits the birefringent layer 7 to generate a component of light vertical (parallel with a transmission axis of the first polarization plate 5) to the absorption axis P1, whereby light leakage is caused.

Compared with this, the liquid crystal display device is constituted so that the azimuthal angle $\theta$ takes the value described above, whereby the light leakage is inhibited from occurring in the thickness direction of the birefringent layer 7.

Accordingly, in the liquid crystal display device, a function as the +C plate can be more secured.

The liquid crystal display device of the invention may have a plurality of birefringent layers formed therein.

In this case, the plurality of birefringent layers may be layers different from one another in the birefringent characteristics. Hereinafter, in some cases, a layer different in the birefringent characteristics from that of the birefringent layer 7 is called a different birefringent layer. That is, a different birefringent layer forms a layer having the birefringent characteristics different from the birefringent characteristics (+C plate) of the birefringent layer 7 in the first embodiment.

In this case, the different birefringent layer has an optical axis different from that of the birefringent layer 7 having an inclined optical axis.

Specifically, the different birefringent layer may be a layer having the birefringent characteristics such that the refractive indices satisfy $nz=nx<ny$ or $nz=ny<nx$, that is, a layer that functions as a so-called [+A plate], or a layer having the birefringent characteristics such that the refractive indices satisfy $nz<nx=ny$, that is, a layer that functions as a so-called [−C plate].

The different birefringent layer that functions as the so-called [+A plate] may be formed between the first polarization plate and the birefringent layer 7 such as a position between the first polarization plate 5 and the first substrate 3 or a position between the first substrate 3 and the birefringent layer 7.

The so-called [+A plate] is obtained specifically in such a manner that, for example, a resin material or a film material capable of horizontally aligning liquid crystals is used to form a horizontal alignment film forming coating film on a surface thereof, the surface of the horizontal alignment film forming coating film is rubbed or subjected to the optical alignment process to obtain a horizontal alignment film, and a solution prepared by dissolving a liquid crystal in a solvent is coated on the horizontal alignment film to thereby homogeneously align and fix liquid crystal molecules.

Furthermore, the +A plate may be obtained by preparing a horizontal alignment film similarly to the above on an outside surface or inside surface of the first substrate 3, followed by homogeneously aligning and fixing liquid crystal molecules on the horizontal alignment film.

In the liquid crystal display device, the +A plate is disposed so that an optical axis of the +A plate may be aligned (coincided) with a direction of the absorption axis of the first polarization plate 5 or the second polarization plate 6.

When a liquid crystal display device is constituted like this, light having passed sequentially a second polarization plate, a second substrate and a liquid crystal layer is allowed to pass the +C plate and then pass the +A plate to propagate to a first polarization plate. Thereby, a liquid crystal display device is obtained that may exert an optical compensation function of suppressing the light leakage in a direction oblique to the thickness of the liquid crystal display device of such light due to a combination structure of the +C plate and +A plate, which results in expansion of the viewing angle of the liquid crystal display device.

Figure 3A:
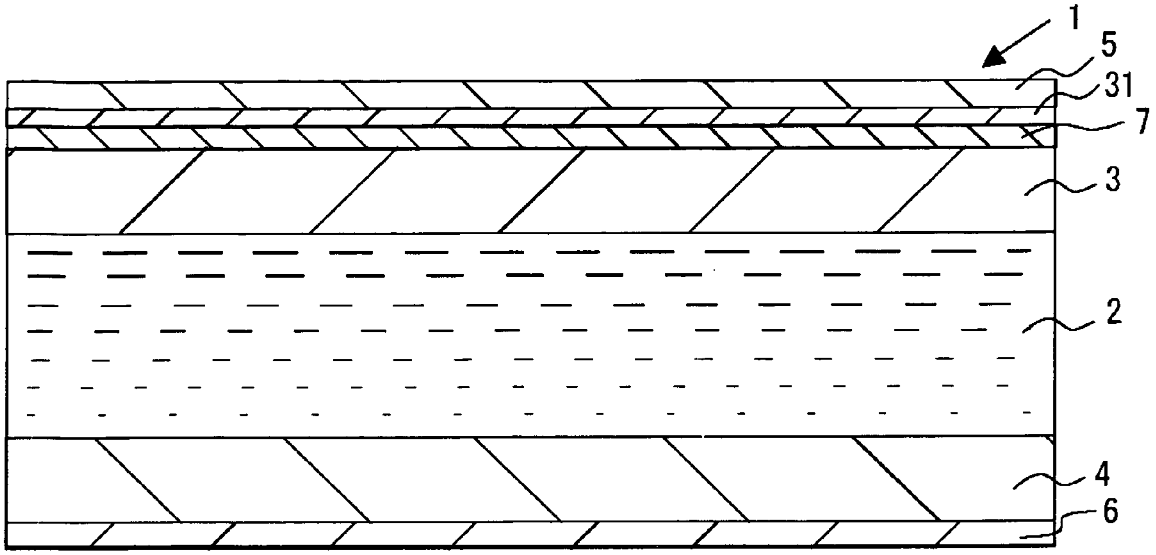
FIG. 3A is a schematic sectional view for explaining an arrangement place of a birefringent layer.
Figure 3B:
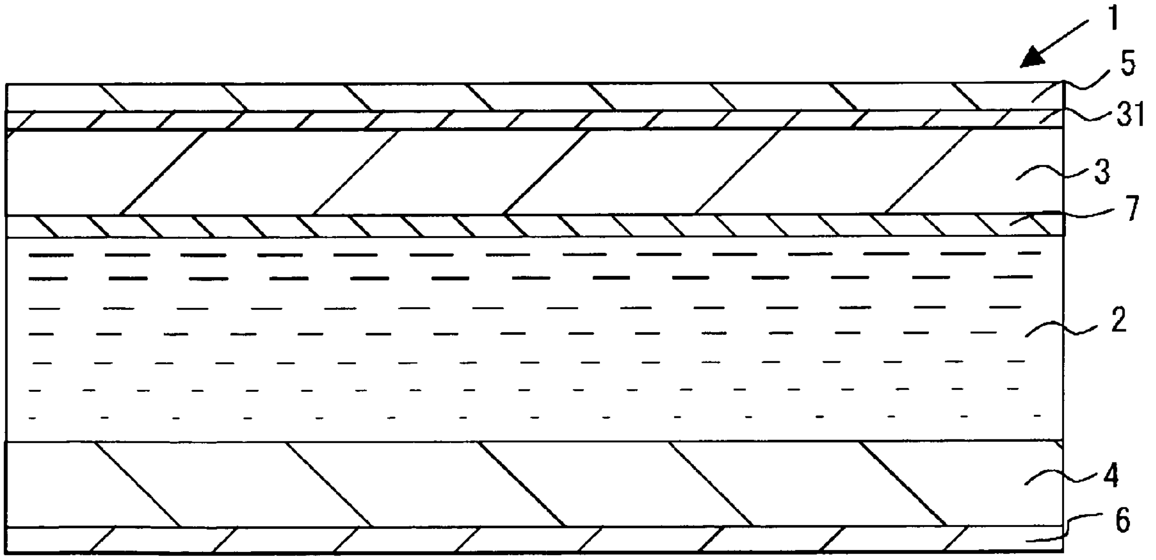
FIG. 3B is a schematic sectional view for explaining an arrangement place of a birefringent layer.
Figure 3C:
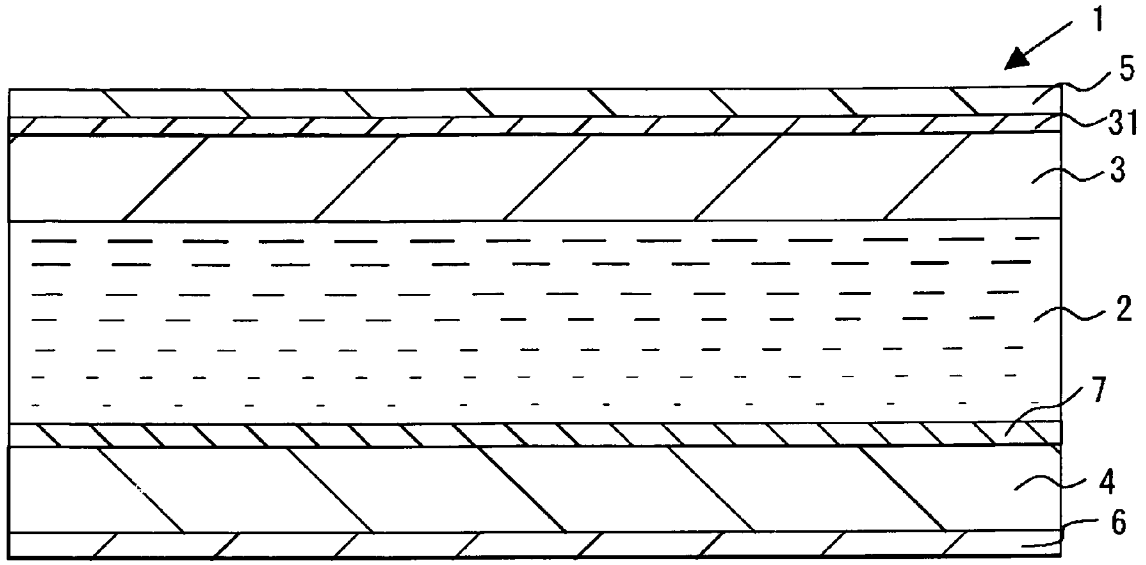
FIG. 3C is a schematic sectional view for explaining an arrangement place of a birefringent layer.

Furthermore, when a plurality of birefringent layers (birefringent layer 7 and different birefringent layer 31) different in the optical axis are formed, the birefringent layer 7 and the different birefringent layer 31 may be laminated abutted each other (FIG. 3A). However, without restricting thereto, the birefringent layers different in the optical axis may be laminated and formed with a layer different from the birefringent layer 7 and the different birefringent layer 31 being interposed at a position between the first substrate 3 and the polarization plate 5, a position between the first substrate 3 and the liquid crystal layer 2 or a position between the liquid crystal layer 2 and the second polarization plate 6 (FIGS. 3B and 3C).

In order to protect the surface of the birefringent layer 7, a protective layer (not shown) such as an insulating film of an acrylic photosensitive resin may be laminated on the surface of the birefringent layer 7.

In what follows, a method for producing a liquid crystal display device of the invention will be described in detail.

The liquid crystal display device of the invention may be produced as follows.

In the beginning, a previously oriented base material is prepared as a base material for constituting a first substrate 3 on which a birefringent layer 7 is laminated and formed. For example, as the base material, one that is oriented per se such as a uniaxially stretched film or a biaxially stretched film or one obtained by illuminating polarized light on an optical alignment film is prepared.

Depending on the kind of the liquid crystal contained in the birefringent layer 7 formed on a surface of the base material or the orientation that is imparted to the liquid crystal, a process that enables to readily orient the liquid crystal (process of easy orientation) is applied in advance, and one obtained as the result of the process of easy orientation may be used as the base material.

A base material subjected to the process of easy orientation may be, for example, one prepared by forming an alignment film on a base material to be capable of imparting the orientation of the liquid crystal. According to a material that has the orientability with an alignment film formed on a base material, there is an advantage in that a direction capable of alignment may be selected in a relatively wide range by variously selecting a composition solution constituting an alignment film.

The process for forming an alignment film, which is carried out as the process of easy orientation, is performed by appropriately selecting conditions in accordance with the kind of the liquid crystal contained in the birefringent layer 7. More specifically, for example, when the birefringent layer 7 is constituted by fixing the liquid crystal contained therein in a homeotropically aligned state, it is preferred to select a process for forming a vertical alignment film to execute as the process of easy orientation.

The vertical alignment film is formed on a surface of a base material as shown below. That is, a film composition solution containing polyimide is prepared with the materials as mentioned above, the film composition solution is coated on a surface of an optically-transparent base material by means of a flexo printing method or a spin coating method to prepare a coating film for a vertical alignment film, and the coating film for a vertical alignment film is cured to obtain a base material provided with a vertical alignment film formed thereon (vertical alignment film forming base material).

In the case where, when an alignment film is formed on the base material, the water repellency or oil repellency of the surf ace of the alignment film is high, UV cleaning or plasma treatment may be interposed in advance within a range that allows the liquid crystal to be homeotropically aligned, to previously heighten the wettability of the surface of the alignment film.

When the base material is thus prepared, a birefringent layer 7 is laminated and formed on the base material via various steps as shown below.

In the beginning, a liquid crystal that constitutes a birefringent layer 7 that is laminated on a base material is dispersed in a solvent to prepare a birefringent layer composition solution. The birefringent layer composition solution is coated on a surface of the base material to form a coating film (coating film forming process). More specifically, for example, a vertical alignment film forming base material is prepared as a base material, liquid crystal molecules and polyimide are dissolved in a solvent to prepare a birefringent layer composition solution, and the birefringent layer composition solution is coated on a surface of a vertical alignment film of the vertical alignment film forming base material to prepare a coating film.

As a method of coating the birefringent layer composition solution in the coating film forming process, well known methods may be used. Specifically, various methods such as a spin coat method, a die coating method, a slit coating method, a roll coat method, a gravure coat method, a slide coat method and a dipping method or an appropriate combination thereof may be used to coat a coating solution on a base material. In order to improve the adhesiveness between the base material and the coating film, an adhesive layer may be disposed on the base material and a birefringent layer composition solution may be coated on the adhesive layer, as described in Japanese Patent Application Laid-Open No. 8-278491.

A weight ratio of the liquid crystal in the birefringent layer composition solution is in the range of 5 to 50% by weight. When the weight ratio is larger than 50% by weight, a film thickness distribution of the birefringent layer 7 may be larger, and, when it is less than 5% by weight, the irregularity in coating thickness may be caused. Considering the situations, the weight ratio of liquid crystal is preferably in the range of 5 to 50% by weight and more preferably in the range of 10 to 30% by weight.

The solvent is not particular restricted as far as it may dissolve a polymerizable liquid crystal, and an organic solvent may be appropriately selected. When a spin coat method is used to coat the birefringent layer composition on the base material to form a coating film, preferable examples of the solvent include 3-methoxybutyl acetate, diethylene glycol dimethyl ether, propylene glycol monomethyl ether acetate and cyclohexanone.

In order to effectively homeotropically align liquid crystal molecules, polyimide having an alkyl group on a side chain may be blended in the birefringent layer composition solution. In this case, in the birefringent layer composition solution, a blending ratio of the polyimide having an alkyl group on a side chain and the liquid crystal is, by weight ratio, in the range of 1/7 to 1/3. The blending ratio of the polyimide in the birefringent layer composition solution is set preferably in the range of 12.5 to 25% by weight, more preferably in the range of 15 to 22.5% by weight, with respect to a total amount of the liquid crystal in the birefringent layer composition solution. When the blending ratio of the polyimide is less than 12.5% by weight, it may be difficult to obtain a sufficiently uniformly homeotropically aligned birefringent layer composition. On the other hand, when the blending ratio is larger than 25% by weight, there is fear in that light transmittance is deteriorated.

A photopolymerization initiator is preferably added to the birefringent layer composition solution.

A radical polymerizing initiator is preferably used as the photopolymerization initiator. The radical polymerization initiator generates a free radical due to energy of UV-ray and so on. Examples thereof include benzyl (also called bibenzoyl), benzoin isobutyl ether, benzoin isopropyl ether, benzophenone, benzoyl benzoate, benzoyl methyl benzoate, 4-benzoyl-4'-methyldiphenyl sulfide, benzyl methyl ketal, dimethylaminomethyl benzoate, 2-n-butoxyethyl-4-dimethylaminobenzoate, p-dimethylaminobenzoic acid isoamyl, 3,3'-dimethyl-4-methoxybenzophenone, methylobenzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In the invention, commercially available photopolymerization initiators may be appropriately used. Examples thereof include ketone-base compounds such as "Irgacure 184 (trade name, substance name: 1-hydroxy-cyclohexyl-phenyl-ketone)", "Irgacure 369 (trade name, substance name:
2-benzyl-2-dimethylamino-1-(4-morpholinophenyl)-butane-1-one)", "Irgacure 651 (trade name, substance name:
2,2-dimethoxy-1,2-diphenylethane-1-one)", "Irgacure 907 (trade name, substance name:
2-methyl-1-(4-(methylthio)phenyl)-2-morpholinopropane-1-one)", and "Dalocure 1173 (trade name, substance name:
(2-hydroxy-2-morpholinopropane-1-one)", which are produced by Ciba Specialty Chemicals Co., Ltd.; and bi-imidazole-base compounds such as
2,2'-bis(o-chlorophenyl)-4,5,4'-tetraphenyl-1,2'biimidazole (produced by Kurogane Kasei K. K.).

The photopolymerization initiator is preferably added in a range that does not largely damage the liquid crystal regularity of the polymerizable liquid crystal. The photopolymerization initiator is added in the birefringent layer composition solution generally in the range of 0.01 to 10% by weight, preferably in the range of 0.1 to 7% by weight and more preferably in the range of 0.5 to 5% by weight.

Other than the photopolymerization initiator, a sensitizer may be added to the birefringent layer composition solution in a range that does not damage the object of the invention. A specific addition amount thereof may be selected within the range of 0.01 to 1% by weight.

Furthermore, the photopolymerization initiators and the sensitizers, respectively, may be used singularly or in a combination of at least two kinds thereof.

A surfactant is preferably added to the birefringent layer composition solution. When the surfactant is added to the birefringent layer composition solution, the orientation of liquid crystal molecules at an interface with air is controlled in a coating film obtained with application of the birefringent layer composition solution.

The surfactant is not particularly restricted as far as it does not damage the liquid crystal developability of the polymerizable liquid crystal. Examples thereof include nonionic surfactants such as polyoxyethylene alkylether, polyoxyethylene alkylallylether, a polyoxyethylene derivative, a polyoxyethyle/polyoxypropylene block copolymer, polyoxyethylene sorbitan fatty acid ester, polyoxyethylene sorbitol fatty acid ester, polyoxyethylene fatty acid ester and polyoxyethylene alkylamine; and anionic surfactants such as an aliphatic acid salt, an alkyl sulfate ester salt, an alkyl benzene sulphonate, an alkyl naphthalene sulphonate, an alkyl sulfosuccinate, an alkyldiphenylether disulfonate, an alkyl phosphate, a polyoxyethylene alkyl sulfate ester salt, a naphthalene sulfonate/formalin condensate, a special polycarbonic acid polymer surfactant, and polyoxyethylene alkylphosphate ester.

The surfactant is added to the brirefringent layer composition solution generally in the range of 0.01 to 1% by weight and preferably in the range of 0.05 to 0.5% by weight.

When a coating film is formed on the base material in the coating film forming process, the liquid crystal contained in the coating film is rendered a liquid crystal phase and, as shown below, for example, a state where the liquid crystal is homeotropically aligned.

That is, when the coating film is heated to a temperature not lower than a temperature where the liquid crystal in the coating film becomes a liquid crystal phase (liquid crystal phase temperature) and less than a temperature where the liquid crystal in the coating film becomes an isotropic phase (liquid phase), the liquid crystal is homeotropically aligned. The means for heating the coating film at this time are not particularly restricted, and may be means disposed under a heating atmosphere or under an infrared ray.

A realizable method of homeotropically aligning liquid crystal includes, other than the above method, a method in which a coating film is dried under reduced pressure in accordance with a liquid crystal contained in the coating film and a state of the coating film, and a method in which an electric field or a magnetic field is applied from a predetermined direction to the coating film.

When the coating film is dried under reduced pressure to homeotropically align the liquid crystal, the coating film is supercooled by applying the reduced pressure and thereby, with a state where the liquid crystal in the coating film is homeotropically aligned substantially retained, the coating film can be further cooled to room temperature. As a result, until the liquid crystal is crosslinking reacted, a state where the liquid crystal is homeotropically aligned is efficiently maintained without being disturbed largely.

The liquid crystal homeotropically aligned in the coating film is crosslinking reacted as shown below to be fixed, thereby to form a birefringent: layer 7 (called a birefringent layer forming process).

The crosslinking reaction is made to progress by illuminating (exposing) light having a photosensitive wavelength of the liquid crystal to the coating film. In this event, a wavelength of light illuminated to the coating film is appropriately selected depending on the kind of the liquid crystal contained in the coating film. The light that is illuminated to the coating film, without restricting to monochromatic light, may be light having a definite wavelength region including the photosensitive wavelength of the liquid crystal.

As the light used for exposure, ionizing radiation is preferred from the viewpoint of a magnitude of excitation energy. An illumination amount of the ionizing radiation is appropriately selected depending on a polymerizable liquid crystal used. When UV-ray is used as the ionizing radiation, the illumination amount thereof is preferably controlled so that an exposure amount at a site designed to be a liquid crystal phase is substantially in the range of 10 to 1000 $mJ/cm^2$, and a wavelength thereof is preferred to be substantially in the range of 200 to 450 nm.

As a method of curing the liquid crystal contained in the coating film, available is a method in which an electron beam substantially in the range of 50 to 500 Gy is irradiated to the coating film to cure the liquid crystal.

The crosslinking reaction of the liquid crystal is preferably carried out while heating the coating film to a temperature lower by 1 to 10° C. than a temperature where the liquid crystal causes a phase transition from the liquid crystal phase to the isotropic phase. By doing so, the liquid crystal is reduced in causing disorder in the homeotropic alignment at the time of the crosslinking reaction. Furthermore, from the viewpoint, the crosslinking reaction is preferably carried out at a temperature lower by 3 to 6° C. than a temperature where the liquid crystal causes a phase transition from the liquid crystal phase to the isotropic phase.

In addition, the crosslinking reaction of the liquid crystal maybe performed according to, other than the method mentioned above, a method (referred to as a method A) in which light having a photosensitive wavelength of the liquid crystal is illuminated to the coating film in an inert gas atmosphere while heating the coating film to the liquid crystal phase temperature.

In the method A, the liquid crystal is crosslinked under an inert gas atmosphere. Accordingly, in comparison with the case where the liquid crystal is crosslinked under an air atmosphere, the alignment of the liquid crystal molecules is more inhibited from disordering.

Furthermore, the crosslinking reaction of the liquid crystal may be performed according to a method (referred to as a method B) where, in an inert gas or air atmosphere, light having a photosensitive wavelength of the liquid crystal is illuminated to the coating film while heating the coating film to the liquid crystal phase temperature, to thereby partially progress the crosslinking reaction (referred to as a partial crosslinking process); after the partial crosslinking process, the coating film is cooled to a temperature where the liquid crystal becomes a crystalline phase (Tc); and in this state, light having a photosensitive wavelength is further illuminated to the coating film to progress and complete the crosslinking reaction. The above-mentioned temperature Tc is a temperature where, in the coating film prior to progressing the crosslinking reaction, the liquid crystal becomes a crystalline phase.

In the partial crosslinking process, even when the coating film is cooled to the temperature Tc, the crosslinking reaction proceeds to an extent where the orientation of the liquid crystal contained in the coating film may be retained. Accordingly, an extent of progress of the crosslinking reaction in the partial crosslinking step is appropriately selected depending on the kind of the liquid crystal contained in the coating film, a film thickness of the coating film and so on. The crosslinking reaction is preferably made to progress until the degree of crosslinking of the liquid crystal becomes in the range of 5 to 50 in the partial crosslinking step.

Although the method B may be carried out under any one of the inert gas atmosphere and air atmosphere, the air atmosphere is preferably adopted from the viewpoint of suppressing the producing cost of the liquid crystal display device, because equipment for performing the process of crosslinking reaction is simplified.

When the birefringent layer forming process is thus carried out, the polymerizable liquid crystal in the coating film formed on the base material is crosslinking polymerized and cured to form a birefringent layer 7, whereby the first substrate 3 provided with the birefringent layer 7 is formed.

Next, a base material that constitutes a second substrate 4 is prepared. The base material may be same as that of the first substrate 3 or may be different therefrom.

A liquid crystal layer is formed as follows by use of the first substrate 3 provided with the birefringent layer 7 and the second substrate 4.

In the beginning, the first substrate 3 and second substrate 4 are oppositely disposed spaced with a slight gap therebetween, and a spacer (such as a ball spacer or columnar spacer) is disposed in the gap between the first substrate 3 and the second substrate 4 to fix a cell gap between the first substrate 3 and second substrate 4.

Next, a sealing agent (thermosetting resin) is used to form a space portion defined by the sealing agent between the both substrates (the first substrate 3 and second substrate 4). Then, when the space portion is filled with a liquid crystal material to encapsulate the liquid crystal, a liquid crystal layer 2 is formed.

Furthermore, a first polarization plate 5 and a second polarization plate 6, respectively, are disposed so that their absorption axes P1 and P2 are orthogonal to each other when seen in a thickness direction of the liquid crystal layer 2, on an outside surface of the first substrate 3 and on an outside surface of the second substrate 4 with the both substrates 3 and 4 sandwiched therebetween. At this time, the both polarization plates (first polarization plate 5 and second polarization plate 6) are arranged in cross Nicol. Furthermore, a thickness direction of the birefringent layer 7 coincides with a thickness direction of the liquid crystal layer 2, and the both polarization plates 5 and 6 are disposed in cross Nicol as well when seen in the thickness direction of the birefringent layer 7.

When, in the birefringent layer forming step, liquid crystal molecules are substantially completely fixed in the homeotropically aligned state, a tilt angle ϕ of a refractive index ellipse that designates the birefringent characteristics of the birefringent layer 7 is substantially 0°, so that the first and second polarization plates may be disposed without considering a state of a refractive index ellipse of the birefringent layer.

When, in the birefringent layer forming step, the birefringent layer 7 is formed with a tilt angle ϕ of a refractive index ellipse that designates the birefringent characteristics other than 0°, the first polarization plate 5 and second polarization plate 6 are disposed so that a rough value of an azimuthal angle θ in the refractive index ellipse of the birefringent layer 7 may be any one of 0°, 90°, 180° and 270°. That is, the first polarization plate 5 and the second polarization plate 6 are disposed so that, when the refractive index ellipse of the birefringent layer 7 is seen in a thickness direction of the birefringent layer 7, any one of the absorption axis P1 of the first polarization plate 5 and the absorption axis P2 of the second polarization plate 6 coincides (overlaps) with a direction of a major axis "a" (optical axis) of the refractive index ellipse of the birefringent layer 7.

Thus, a liquid crystal display device 1 of the invention is produced.

The liquid crystal display device of the first embodiment of the invention may have a colored layer 8 formed on at least one of the opposite substrates (referred to as a second embodiment).

Figure 4B:
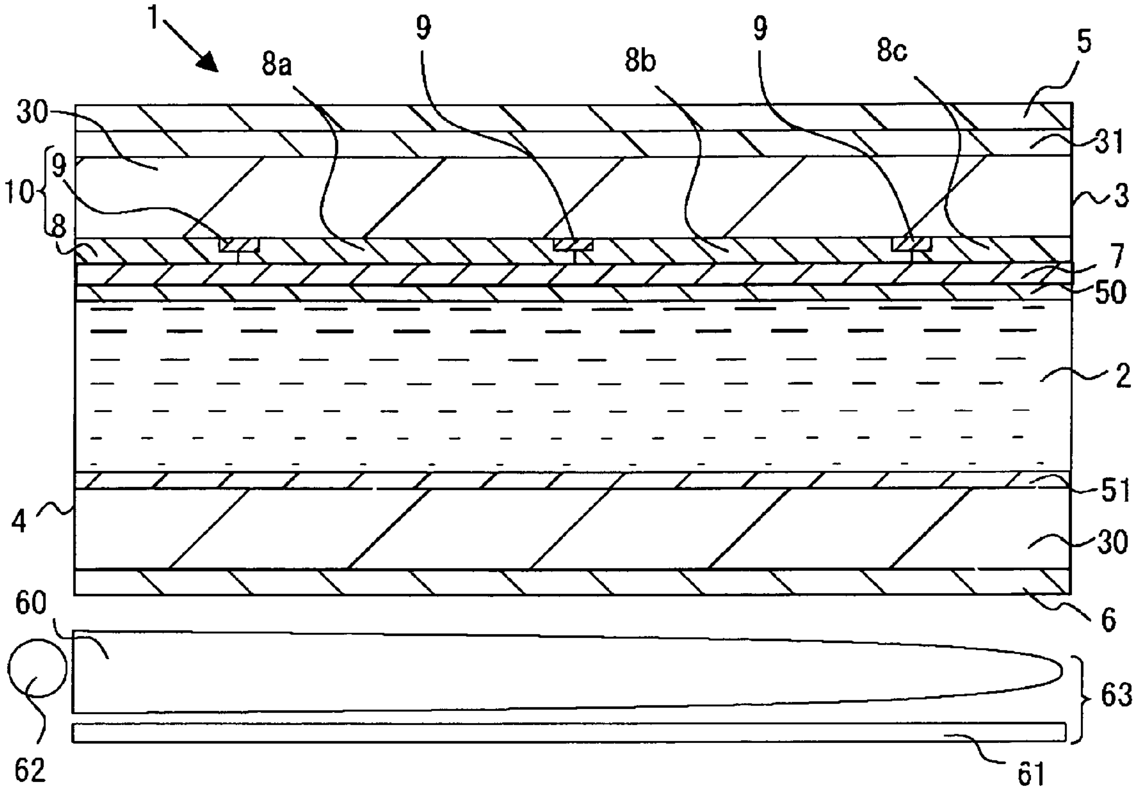
FIG. 4B is a schematic sectional view for explaining one example of a liquid crystal display device provided with a colored layer.

FIG. 4B is a schematic view showing a sectional structure in an example of the liquid crystal display device of the second embodiment.

In the liquid crystal display device 1, a colored layer 10 is laminated and formed as a functional layer on a base material 30 that constitutes one (such as a first substrate 3) of the opposite substrates, and a birefringent layer 7 is further laminated on a surface of the colored layer 10. A different birefringent layer 31 is formed between the substrate on which the colored layer 10 is formed and a first polarization plate 5.

The colored layer 10 includes a colored pixel portion 8 that transmits visible light of a predetermined wavelength region and a light shielding portion 9 (referred to as a black matrix or BM in some cases).

The colored pixel portion 8 is formed by disposing colored pixels that transmit lights of wavelength bands of the respective colors of red, green and blue (respectively referred to as a red colored pixel 8*a*, a green colored pixel 8*b* and a blue colored pixel 8*c*) on the base material 30 in a predetermined pattern. As a layout mode of the red colored pixels 8*a*, green colored pixels 8*b* and blue colored pixels 8*c* that constitute the colored pixel portion 8, various layout patterns such as a stripe pattern, a mosaic pattern and a triangle pattern may be selected.

Furthermore, colored pixels that transmit lights having wavelength bands of complementary colors of the respective colors may be used in place of the colored pixels (8*a*, 8*b* and 8*c*).

The colored pixel portion 8 is formed, for every colored pixels of the respective colors (8*a*, 8*b* and 8*c*), by patterning a coating film of a coloring material dispersion solution obtained by dispersing a coloring material of a colored pixel in a solvent in a predetermined shape by means of, for example, a photolithography method.

In addition, other than by the photolithography method, the colored pixel portion 8 may be also formed by coating a coloring material dispersion solution in a predetermined shape for every colored pixels of the respective colors (8*a*, 8*b* and 8*c*).

The light shielding portion 9 inhibits the colored pixels (8*a*, 8*b* and 8*c*) from overlapping each other; buries a gap between the colored pixels to inhibit light from leaking from between adjacent colored pixels; and when it is provided in an active matrix driven liquid crystal display device, inhibits an active element from deteriorating due to light.

Accordingly, the light shielding portion 9 is formed so that a region on the surface of the substrate 30 corresponding to positions where colored pixels are disposed is partitioned in plan view for individual colored pixels (8*a*, 8*b* and 8*c*). Then, in accordance with the forming positions of the regions on the surface of the base material 30 partitioned by the light shielding portion 9, the colored pixels of the respective colors (8*a*, 8*b* and 8*c*) are disposed so as to cover the regions in a plan view.

The light shielding portion 9 may be formed by patterning a metal thin film having light shielding property or light absorbing property such as a metal chromium thin film or a tungsten thin film on the surface of the base material 30 in a predetermined shape. Also, the light shielding portion 9 may be formed by printing an organic material such as a black resin in a predetermined shape.

According to the liquid crystal display device of the second embodiment having the colored layer 10 formed therein, color display may be realized.

Figure 6:
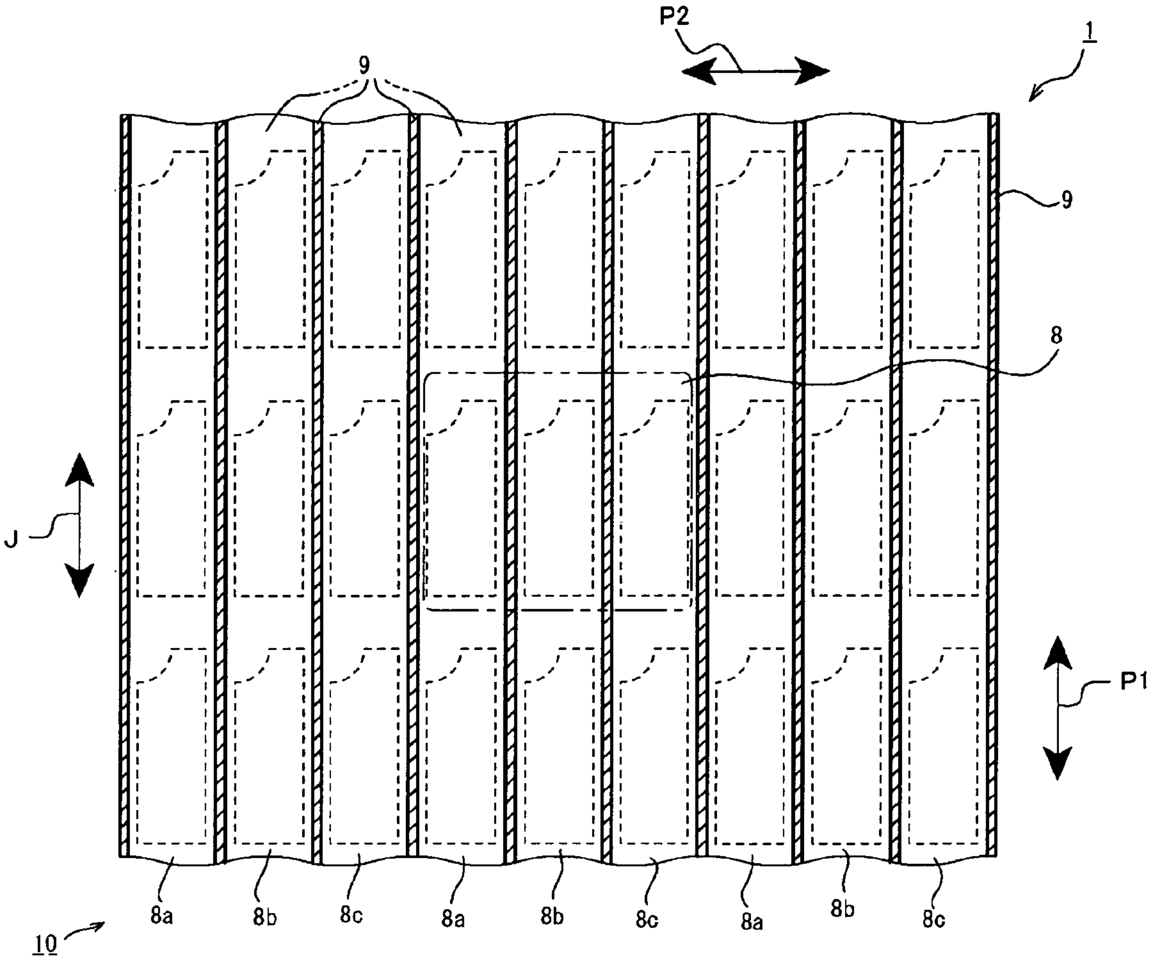
FIG. 6 is a view for explaining an arrangement relationship of a colored layer and a polarization plate in the liquid crystal display device provided with a colored layer.

When, in the liquid crystal display device of the second embodiment, colored pixels that constitute the colored pixel portion 8 of the colored layer 10 (red colored pixel 8*a*, green colored pixel 8*b* and blue colored pixel 8*c*) are disposed in a stripe layout pattern, the red colored pixel 8*a*, green colored pixel 8*b* and blue colored pixel 8*c* are arranged in straight line. In such a liquid crystal display device, a direction of any one of absorption axes (P1 and P2) of the first and second polarization plates (shown by arrows P1 and P2 in FIG. 6) preferably, as shown in FIG. 6, coincides with a longitudinal direction (shown by an arrow J in FIG. 6) of stripe type colored pixels (8*a*, 8*b* and 8*c*). In the example of FIG. 6, longitudinal directions of the stripe type colored pixels (8*a*, 8*b* and 8*c*) coincide with the absorption axis P1 of the first polarization plate in the liquid crystal display device 1. However, without restricting thereto, these may coincide with the absorption axis P2 of the second polarization plate.

Here, the inventors have found a phenomenon in that, when a birefringent layer 4 is formed on a colored layer 10 provided with a colored pixel portion 8 where stripe type colored pixels are disposed, an optical axis "a" of the birefringent layer 4 is directed in a direction orthogonal, in a plan view, to a longitudinal direction of the colored pixels. The liquid crystal display device 1 is an invention completed by applying the phenomenon and has an advantage in that the display device can be efficiently produced. More specifically, a stripe type is adopted as a layout pattern of colored pixels and a direction of an absorption axis of a polarization plate is made to coincide with a longitudinal direction of the colored pixel which is easy to visually conceive. With this configuration, it is possible to surely, simply and efficiently allow a tilt direction of an optical axis of the birefringent layer 4 to be matched with an absorption axis of any one of the first polarization plate or the second polarization plate, whereby a liquid crystal display device efficiently produced is provided.

When the birefringent layer 4 is formed on the colored layer 10 provided with the colored pixel portion 8 where stripe colored pixels are disposed, a detail of the reason why the optical axis "a" of the birefringent layer 4 is readily directed in a direction orthogonal to a longitudinal direction of the colored pixel is unknown. However, it is considered that the shape of the colored pixel 8 and a method and conditions for forming the colored pixel 8 cause the phenomenon.

Figure 5A:
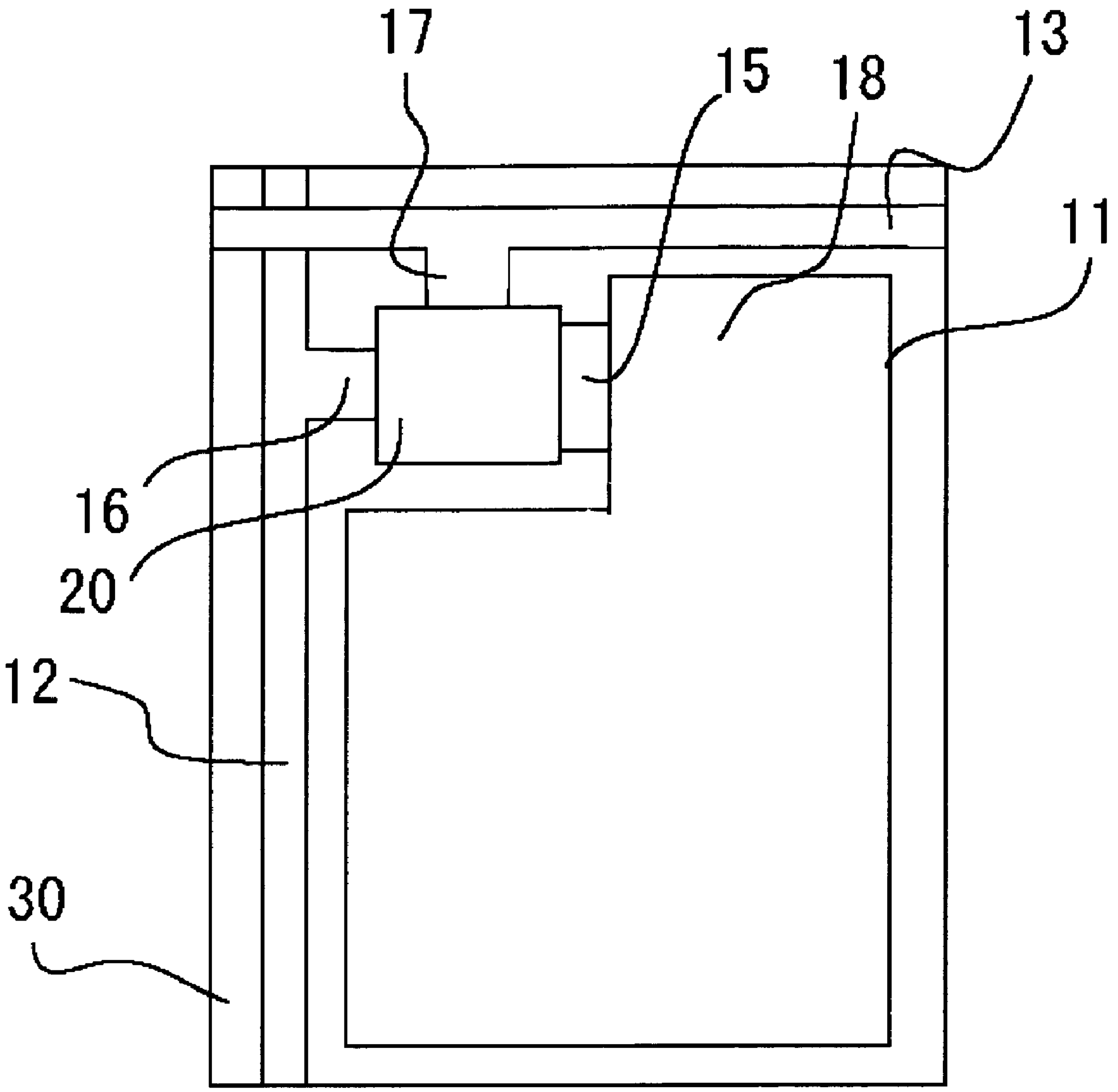
FIG. 5A is a schematic plan view for explaining a switching circuit in the liquid crystal display device of the invention.
Figure 5B:
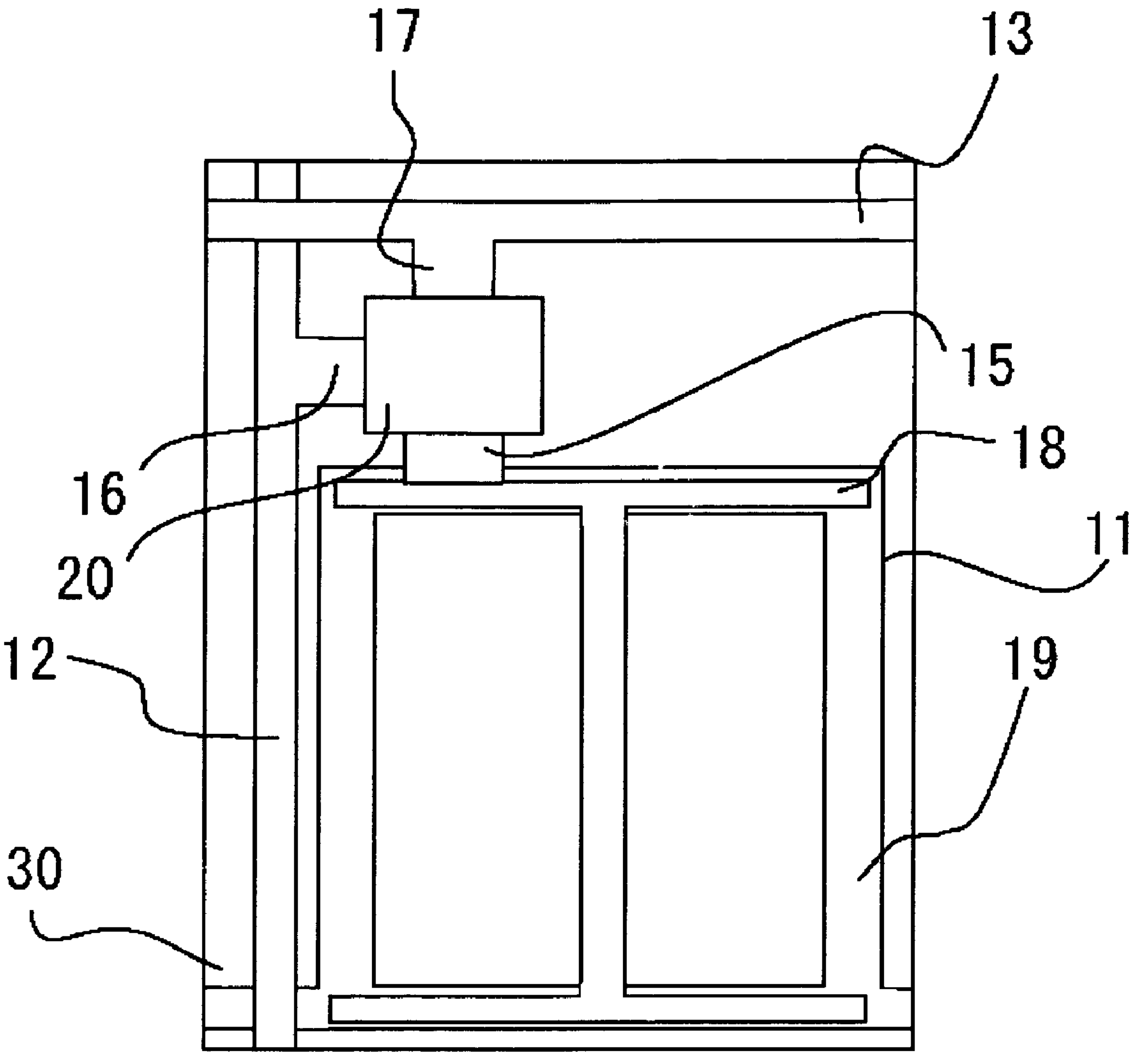
FIG. 5B is a schematic plan view for explaining another switching circuit in the liquid crystal display device of the invention.

In the liquid crystal display devices according to the first and second embodiments in the invention, a switching circuit 20 may be provided on the first substrate 3 or second substrate 4 (referred to as a third embodiment) (FIGS. 5A and 5B).

Examples of the switching circuit 20 include one in which a pixel electrode and an electrode that faces the pixel electrode to apply an electric field to a liquid crystal layer are not disposed on a surface of a same substrate (such as TN (Twisted Nematic) mode and VA (Vertical Alignment) mode) (referred to as a first mode) and one in which these are disposed on a surface of a same substrate (such as IPS (In-Plane-Switching) mode) (referred to as a second mode).

A description will be given of a switching circuit in which a pixel electrode and an electrode opposite thereto (common electrode), which constitute an electrode portion, are not disposed on a same substrate (FIG. 5A).

A switching circuit 20 of the first mode is constituted in layer by laminating formation on a substrate 30 corresponding to a pixel electrode 18 disposed to each of pixels, and is provided with an element substrate as a functional layer together with the pixel electrode 18 and various elements such as a signal line and a scanning line that are electrically connected to the pixel electrode 18.

The switching circuit 20 receives an electrical signal from the scanning line 13 to control energization states of the signal line 12 and the electrode portion 11. Specific examples of the switching circuits 20 include active elements such as a three-terminal device such as a thin film transistor (TFT) or the like and a two-terminal device such as a MIM (Metal Insulator Metal) diode.

When the switching circuit 20 is a thin film transistor, the switching circuit 20 is formed in such a manner that a drain electrode 15 connected to each of the pixel electrodes 18, a source electrode 16 that receives an electrical signal from the signal line 12 and a semiconductor that is interposed between the drain electrode 15 and the source electrode 16 to connect both electrodes are laminated on a bas material and a gate electrode 17 laminated to the semiconductor through an insulating layer (not shown) is further laminated. Note that the gate electrode is connected to the scanning line 13.

The electrode portion 11 is constituted of the pixel electrode 18 and the common electrode (not shown). A transparent electrode such as an ITO (Indium Tin Oxide) electrode is preferably used as the electrode portion 11. The electrode portion is formed by arranging the transparent electrode over the substantially entire surface of a region where the respective pixels are formed. In addition, the electrode portion 11 is formed also by arranging a slender transparent electrode at an end edge of the respective pixel regions.

Next, a description will be given of the switching circuit 20 of the second mode where a pixel electrode and a common electrode, which constitute an electrode portion, are disposed on a same substrate (FIG. 5B). In an element substrate having the switching circuit 20 formed thereon, a region other than a region where the electrode portion 11 is formed in the same pixel region is constituted similarly to the first mode. In a region where the electrode portion 11 is formed, both of a pixel electrode and an electrode opposite thereto are laminated and formed on the same pixel region.

That is, in the electrode portion 11 including the pixel electrode 18 and the common electrode 19, the common electrode 19 is provided so as to face the pixel electrode 18 connected to the drain electrode 15 on the surface of the same substrate. For example, arrangement is made such that, as shown in FIG. 5B, the common electrodes 19 are disposed so as to face each other in two directions (in the example of FIG. 5B, a direction approaching the signal line and a direction leaving from the signal line 12) with respect to one pixel electrode 18. In FIG. 5B, the electrode portion 11 is provided with the pixel electrode 18 and the common electrode in a comb teeth shape. In a region where the pixel electrode and the common electrode 19 overlap each other, an insulating layer is disposed to inhibit the switching circuit 20 from short-circuiting.

When the switching circuit 20 of the first mode or the second mode is provided on the first substrate 3 or the second substrate 4 to constitute a liquid crystal display device of the third embodiment, liquid crystal display in the liquid crystal display device is controlled in accordance with the energization state of the switching circuit.

EXAMPLES

Example 1

As shown below, a birefringent layer and an alignment film were sequentially laminated on a base material to prepare a first substrate provided with a birefringent layer.

<Preparation of Vertical Alignment Film>

A solution for vertical alignment film (trade name: JALS-2021-R2, produced by JSR Corporation) is diluted with γ-butylolactone at two times to prepare an alignment film composition solution.

The alignment film composition solution is coated on a surface of a glass substrate (trade name: 7059 Glass, produced by Corning Co., Ltd.) (dimension: 550 mm×650 mm) as a base material that becomes a first substrate, to prepare an alignment film-forming coating film. Then, the glass substrate on which the alignment film-forming coating film is formed is baked at 180° C. for 1 hr to obtain a base material having a vertical alignment film formed thereon (referred to as a vertical alignment film-forming base material).

<Preparation of Birefringent Layer-Forming Coating Film>

As a solution containing polyimide, prepared is a solution obtained by diluting a solution for vertical alignment film (trade name: JALS-2021-R2, produced by JSR Corporation) with diethylene glycol dimethylether at 8 times.

Then, as polymerizable liquid crystal molecules showing a nematic liquid crystal phase (polymerizable liquid crystal), 20 parts by weight of a compound represented by the chemical formula (Chem 11) (having a value of X of 6), 0.8 part by weight of a photopolymerization initiator (trade name: Irgacure 907, produced by Ciba Geigy Co., Ltd.), 59.2 parts by weight of chlorobenzene as a solvent and 20 parts by weight of the solution containing polyimide are mixed to prepare a birefringent layer composition solution.

A vertical alignment film-forming base material was set on a spin coater to spin coat the birefringent layer composition solution on a vertical alignment film, to thereby prepare a coating film (referred to as a birefringent layer-forming coating film). The birefringent layer-forming coating film obtained at this time was clouded in white. When a coating film was prepared by the spin coating method, a coater system (trade name: TR40000F, produced by Tokyo Ohka Kogyo Co., Ltd.) was used. The coater system is a system that integrally applies bar coating and spin coating of the birefringent layer composition solution to a surface of the vertical alignment film-forming base material and reduced pressure drying of the birefringent layer-forming coating film.

A dry film thickness of the prepared birefringent layer-forming coating film was substantially 1.5 μm. The film thickness was measured by use of a contact profilometer (trade name: DEKTAK, produced by Sloan Corporation).

<Formation of Homeotropically Aligned State of Liquid Crystal>

The vertical alignment film-forming base material on which the birefringent layer-forming coating film was formed was heated at 100° C. for 3 min, followed by confirming that liquid crystal molecules in the birefringent layer-forming coating film were transited to a liquid crystal phase to form an aligned state. At that time, it was visually confirmed that the birefringent layer-forming coating film became transparent from the white clouded state.

<Crosslinking Polymerization Reaction of Liquid Crystal>

Next, under an air atmosphere, UV-ray was illuminated at an output of 20 $mW/cm^2$ for 10 sec to the transparent birefringent layer-forming coating film by use of a UV-illuminator (trade name: TOSCURE751, produced by Harrison Toshiba Lighting Co., Ltd.) to crosslinking polymerize liquid crystal in the birefringent layer-forming coating film to fix the orientation of the liquid crystal molecules, thereby a birefringent layer was formed. The thus obtained base material on which the birefringent layer was formed was baked at 230° C. for 30 min in an oven to improve the adhesiveness between the birefringent layer and the base material.

Thus, a base material on which a birefringent layer was formed was obtained. Values of nx, ny, nz and $\phi$ each indicating a state or a refractive index ellipse that designates the birefringent characteristics of the birefringent layer are specified as follows.

The refractive indices (nx, ny, nz) indicating a shape of a refractive index ellipse of the birefringent layer are specified by determining the refractive indices in accordance with a liquid crystal molecule.

Next, a tilt state of the refractive index ellipse of the birefringent layer is specified by determining a tilt angle $\phi$.

In the beginning, when an amount of retardation in a front direction is measured by use of a retardation meter, it is determined whether a major axis (optical axis) of the refractive index ellipse tilts or not. That is, when an amount of measured retardation is different from a value that is assumed when, based on the refractive indices and a film thickness of the birefringent layer, an optical axis of the birefringent layer does not tilt (in the case of the tilt angle $\phi=0$), it is determined that the optical axis of the birefringent layer is inclined.

When it is determined that the optical axis of the birefringent layer is inclined, the tilt angle $\phi$ of the optical axis is specified by measuring the retardation by use of a retardation meter as follows.

A position on a surface of the birefringent layer where the retardation is measured is selected in advance. The selected position is taken as a measurement point. The retardation of light (wavelength: 589 nm) in a 45° direction of a polar angle at the measurement point is measured in four azimuth directions different from one another.

Here, the polar angle and four azimuth directions different from one another are defined as follows.

That is, when a measurement point is set at an original point, az-axis is taken in a thickness direction of the birefringent layer, and an x-axis and a y-axis that intersect at the original point and are orthogonal to each other are taken on a surface of the birefringent layer, a space formed from the x-axis, y-axis and z-axis is considered. In this case, a polar angle at a position (K) in the space is defined, with the polar angle set at 0° when K is on the z-axis, as a tilt angle of a straight line that connects the original point and K with respect to the z-axis.

Furthermore, the four mutually different azimuth directions are defined as two azimuth directions (azimuth direction X1, azimuth direction X2) that face each other with the original point interposed therebetween in the x-axis direction and two azimuth directions (azimuth direction Y1, azimuth direction Y2) that face each other with the original point interposed therebetween in the y-axis direction.

The tilt angle $\phi$ is specified by combining values of the retardation measured at a position in a direction of polar angle 45° with respect to each of the four azimuth directions (azimuth directions X1, X2, Y1, Y2) (values of the retardation to the azimuth directions X1, X2, Y1 and Y2, respectively, are expressed by $\Delta n(X1)$, $\Delta n(X2)$, $\Delta n(Y1)$, $\Delta n(Y2)$).

Since the refractive indices (nx, ny, nz) of the refractive index ellipse are specified in accordance with the kind of liquid crystal and the like, a shape of the refractive index ellipse is specified. Accordingly, values of the retardation in the four different directions mentioned above are specified, whereby, from values of $(\Delta n(X1)-\Delta n(X2))$ and $(\Delta n(Y1)-\Delta n(Y2))$, how much the optical axis of the refractive index ellipse is inclined toward the azimuth direction X1 or azimuth direction X2 and how much the optical axis is inclined toward the azimuth direction Y1 and the azimuth direction Y2 are specified. From this, to what degree the optical axis of the refractive index ellipse is inclined to the z-axis is specified.

For example, in the case that $nx=ny<nz$, $(\Delta n(X1)-\Delta n(X2))=\epsilon>0$ (zero) and a value of $(\Delta n(Y1)-\Delta n(Y2))$ is 0 (zero) or almost 0, the refractive index ellipse is specified as a state that tilts in accordance with a value of $\epsilon$ toward the azimuth direction X2 and is hardly inclined towards both of the azimuth direction Y1 and azimuth direction Y2, so that the tilt angle $\phi$ of the refractive index ellipse is specified.

With a measurement point set at a substantially center position (W) of the base material on which the birefringent layer was formed, the tilt angle $\phi$ of the refractive index ellipse at the position W was measured and found that a value of the tilt angle $\phi$ was substantially 1°.

Furthermore, as for the base material on which the birefringent layer was formed, tilt states (tilt state of optical axis) of the refractive index ellipse were measured at a plurality of mutually different positions on the surface of the birefringent layer to evaluate the uniformity of the tilt states.

<Evaluation of Uniformity of Tilt States>

In the beginning, in the base material on which the birefringent layer was formed, mutually different measurement points of 5 points×7 points in total 35 points (35 positions) on the surface of the birefringent layer are selected in a lattice having a distance of 100 mm in a plane direction of the birefringent layer, and a position of a center point of 35 measurement points is matched with the position W. Then, the retardations ($\Delta n(X1)$, $\Delta n(X2)$, $\Delta n(Y1)$, $\Delta n(Y2)$) are measured with respect to the respective measurement points from four directions, the standard deviation of the retardation $\Delta n(X1)$ is calculated, and magnitudes of values of the retardations at the respective measurement points are compared.

As a result, the standard deviation of $\Delta n(X1)$ was 0.29. In this case, it is estimated that, as for states of the refractive index ellipses and states of the optical axes at different positions on the surface of the birefringent layer, the dispersion of the tilt angles is suppressed substantially in the range of 0.4°.

Furthermore, at all of the 35 measurement points, (Δn (X1)−Δn(X2)=ε was larger than 0 and a value of (Δn(Y1)−Δn(Y2)) was almost 0 (zero).

Accordingly, it is shown that, in the base material on which the birefringent layer is formed, optical axes at the respective measurement points of the birefringent layer correspond to a case where the optical axes tilt substantially uniformly in the same direction, and the optical axes at the respective measurement points of the birefringent layer hardly fluctuate. Then, in the base material, the tilt angle of the refractive index ellipse at a substantially center position of the birefringent layer directly shows a tilt angle of an optical axis of the birefringent layer.

<Preparation of Horizontal Alignment Film>

The base material provided with the birefringent layer thus obtained was cut into a size of 20 mm×20 mm, and a horizontal alignment film was prepared on a surface of the birefringent layer of each piece as shown below.

In the beginning, a horizontal alignment film composition solution (trade name: AL1254, produced by JSR Corporation) was coated on a surface of the base material provided with the birefringent layer by means of a flexo printing method to form a coating film (horizontal alignment film-forming coating film), followed by baking a glass substrate on which the horizontal alignment film-forming coating film was formed in an oven at 230° C. for 1 hr, to thereby form a horizontal alignment film.

<Rubbing Step>

By use of a rubbing unit (trade name: RLYY-3, produced by Iinuma Gauge Co., Ltd.), rubbing was applied to the base material on which the horizontal alignment film was formed, in order that, when seen in a thickness direction of the birefringent layer, a rubbing direction was in parallel (coincided) with a directions of a major axis (optical axis) of a refractive index ellipse designating the birefringent characteristics of the birefringent layer. Thus, a first substrate provided with a birefringent layer was obtained.

Next, a base material (glass substrate) of the same kind as that used when the first substrate was prepared, and used as a base material to form a second substrate, to thereby prepare a second substrate.

First, a horizontal alignment film was prepared on a surface of a base material used for the second substrate, via the same process as that where a horizontal alignment film was formed on a surface of the birefringent layer in the first substrate. Furthermore, the rubbing was applied, similarly to the first substrate, on the horizontal alignment film provided on the second substrate base material, to thereby prepare a second substrate.

The first and second substrates provided with a birefringent layer were cut into a size of 20 mm×20 mm, and these were used to prepare a liquid crystal display device as shown below.

<Preparation of Liquid Crystal Layer>

0.4% by weight of a sealing spacer (Trade name: Micro-Pearl SP-2035, produced by Sekisui Chemical Co., Ltd.) was contained in a seal material made of a thermosetting resin (trade name: XN-5A, produced by Mitsui Chemicals Inc.) to prepare a composition solution (seal portion composition solution), and the seal portion composition solution was coated on the second substrate along a peripheral border of the horizontal alignment film to prepare a coated portion (seal liquid coated portion). When the seal liquid coated portion was prepared, a portion of the peripheral border of the horizontal alignment film where the seal portion composition liquid was not coated (referred to as a non-coated portion) was left.

The first and second substrates were disposed with rubbed surfaces thereof facing each other so that directions of aligning liquid crystal due to the rubbing coincided with each other, the seal liquid coated portion of the second substrate was brought into contact with the first substrate, and, the first and second substrates were heated to 140° C. while pressing under pressure of 20 kPa/cm$^2$ so as to maintain the contact state, to cure the seal material. Thereby, a material (called a cell) obtained by integrating the first and second substrates was prepared. The thus obtained cell has a magnitude of about 2 cm×about 2 cm and a cell gap of 3.5 μm.

Thereby, the first substrate and second substrate are disposed facing each other with a slight gap disposed therebetween, and space portions partitioned by a seal portion are formed between the first and second substrates, with an aperture portion being formed at a position of the non-coated portion. Then, a liquid crystal is charged in the space portion to form a liquid crystal layer (driving liquid crystal layer). When the liquid crystal that constitutes the liquid crystal layer is charged, the aperture portion is used as a liquid crystal inlet.

As the liquid crystal constituting the liquid crystal layer, a liquid crystal having positive dielectric anisotropy (trade name: ZLI-2293; Δn=0.132, λ=590 nm, produced by Merck Corporation) was used. Furthermore, when the liquid crystal is charged, a dispenser method may be used. Here, a vacuum charging method was used.

A liquid crystal layer was formed by means of the vacuum charging method as shown below. That is, a cell where the liquid crystal is not yet charged is disposed in a vessel storing a liquid crystal with the liquid crystal inlet directed downward. At this time, the liquid crystal inlet is not dipped in the liquid crystal. Next, the vessel is tightly sealed and air in the vessel is evacuated to form a near vacuum. In this state, the liquid crystal inlet of the cell is dipped in the liquid crystal. Then, with the liquid crystal inlet being dipped in the liquid crystal, pressure inside of the vessel is returned to normal pressure. Thereby, due to the pressure and capillary phenomenon, the liquid crystal is gradually charged from the liquid crystal inlet into a panel to fill the space portion of the cell with the liquid crystal.

After the liquid crystal was charged full in the cell, a UV-curable resin (trade name: LCB-610, produced by EHC Co., Ltd.) was coated at the liquid crystal inlet, followed by illuminating UV-ray to the coated position (position where the liquid crystal inlet was formed) to fix the UV-curable resin at that position, to thereby seal the space portion.

Thus, a cell provided with a liquid crystal layer was obtained.

<Arrangement of Retardation Film and Polarization Plate>

A retardation film (trade name: Arton, produced by JSR Corporation) as the [+A plate] was adhered on an outside surface of the first substrate of the cell where the liquid crystal layer was formed. At this time, the retardation film is adhered on an outside surface of the first substrate so that a direction of an optical axis of the retardation film coincides with a direction (tilt direction of an optical axis) of an optical axis of the birefringent layer when a birefringent layer is seen in a thickness direction of the liquid crystal layer or the birefringent layer.

Subsequently, a polarization plate (trade name: HLC2-5618, produced by Sanritz Corporation) was adhered on a surface of the retardation film of the cell having the retardation film adhered thereon (called a first polarization plate), and a polarization plate same as above was adhered also on an outside surface of the second substrate (called a second polarization plate). The polarization plates, when seen in a thickness direction of the birefringent layer, are adhered to the cell disposed so that an absorption axis of the polarization plate and an absorption axis of the second polarization plate are orthogonal to each other. At this time, the first polarization plate is adhered on the surface of the retardation film so that a direction of the absorption axis of the first polarization plate coincides with a tilt direction of the optical axis of the birefringent layer when the birefringent layer is seen in a thickness direction of the birefringent layer.

Thus, polarization plates were adhered on outside positions of the cell, and thereby a liquid crystal display device was obtained.

The front brightness of the obtained liquid crystal display device was measured to evaluate the light leakage when seen in a thickness direction of the birefringent layer. The front brightness was measured as follows.

<Measurement of Front Brightness>

The front brightness was measured by use of a brightness measurement system constituted of a brightness meter and a light illuminating unit that illuminates light to a liquid crystal display device.

In the brightness measurement system, the brightness meter includes a light sensor that detects light having transmitted through the liquid crystal display device of light emitted from the light illuminating unit and a measurement unit that measures the brightness based on a signal detected by the light sensor. Specifically, [BM-9] (trade name, produced by Topcon Co., Ltd.) was used as the brightness meter for measuring the brightness.

The front brightness was measured by use of the brightness measurement system as shown below.

In the beginning, the light illuminating unit was disposed at an outside position of the second polarization plate of the liquid crystal display device, and the light sensor was disposed outside of the first polarization plate at a position where the light sensor faced the light illuminating unit in a thickness direction of the liquid crystal layer with the liquid crystal display device interposed therebetween.

Light having a wavelength of 550 nm is illuminated from the light illuminating unit toward the liquid crystal display device, the light sensor is caused to detect light having transmitted through the cell from the outside position of the second polarization plate, and an amount of detected light (brightness) is measured at the measurement unit, so that front brightness is measured.

As the result of such a measurement, the front brightness of the liquid crystal display device was 0.23 $cd/m^2$.

Example 2

A liquid crystal display device provided with a first substrate and a second substrate as shown in FIG. 4B was prepared in the same manner as in Example 1, except that a colored layer was formed as shown below on a surface of a base material constituting the first substrate and a birefringent layer was formed on a surface of the colored layer.

<Preparation of Colored Layer>

<Preparation of Coloring Material Dispersion Used for Forming Colored Layer>

A pigment dispersion photoresist was used as a dispersion liquid of each of black matrix (BM) and coloring materials of red (R), green (G) and blue (B) colored pixels. The pigment dispersion photoresist was obtained in such a manner that, using a pigment as a coloring material, beads were added to a dispersion composition (containing a pigment, a dispersant and a solvent), and dispersed for 3 hr by a dispersing unit, followed by mixing the dispersion liquid from which the beads had been removed and a clear resist composition (containing a polymer, a monomer, an additive, an initiator and a solvent). The obtained pigment dispersion photoresist had the following composition. A paint shaker (produced by Asada Tekkosho) was used as the dispersing unit.

(Black Matrix Photoresist)

Black pigment . . . 14.0 parts by weight
(trade name: TM Black #9550, produced by Dainichiseika Color & Chemicals Mfg. Co., Ltd.)
Dispersant . . . 1.2 parts by weight
(trade name: Disperbyk 111, produced by BYK Chemie Co.,)
Polymer . . . 2.8 parts by weight
(trade name: VR60, produced by Showa Highpolymer K. K.)
Monomer . . . 3.5 parts by weight
(trade name: SR399, produced by Sartomer Company, Inc.)
Additive . . . 0.7 parts by weight
(trade name: L-20, produced by Soken Chemical & Engineering Co., Ltd.)
Initiator . . . 1.6 parts by weight
(2-benzil-2-dimethylamino-1-(4-morpholinophenyl)-butanone-1)
Initiator . . . 0.3 parts by weight
(4,4'-diethylamino benzophenone)
Initiator . . . 0.1 parts by weight
(2,4-diethylthioxanthone)
Solvent . . . 75.8 parts by weight
(ethylene glycol monobutyl ether)

(Photoresist for Red (R) Colored Pixel)

Red pigment . . . 4.8 parts by weight
(C.I.PR254 (trade name: Chromophthal DPP Red BP, produced by Ciba Specialty Chemicals Co., Ltd.))
Yellow Pigment . . . 1.2 parts by weight
(C.I.PY139 (trade name: Paliotol Yellow D1819, produced by BASF Co. Ltd.))
Dispersant . . . 3.0 parts by weight
(trade name: Solsperse 24000, produced by Zeneca Co., Ltd.)
Monomer . . . 4.0 parts by weight
(trade name: SR399, produced by Sartomer Company, Inc.)
Polymer 1 . . . 5.0 parts by weight
Initiator . . . 1.4 parts by weight
(trade name: Irgacure 907, produced by Ciba Specialty Chemicals Co., Ltd.)
Initiator . . . 0.6 parts by weight
(2,2'-bis(o-chlorophenyl)-4,5,4',5'-tetraphenyl-1,2'-biimidazole)
Solvent . . . 80.0 parts by weight
(propylene glycol monomethyl ether acetate)

(Photoresist for Green (G)-Colored Pixel)

Green pigment . . . 3.7 parts by weight
(C.I.PG7 (trade name: Seika Fast Green 5316P, produced by Dainichiseika Color & Chemicals Mfg. Co., Ltd.))
Yellow Pigment . . . 2.3 parts by weight
(C.I.PY139 (trade name: Paliotol Yellow D1819, produced by BASF Co. Ltd.))
Dispersant . . . 3.0 parts by weight
(trade name: Solsperse 24000, produced by Zeneca Co., Ltd.)
Monomer . . . 4.0 parts by weight
(trade name: SR399, produced by Sartomer Company, Inc.)
Polymer 1 . . . 5.0 parts by weight
Initiator . . . 1.4 parts by weight
(trade name: Irgacure 907, produced by Ciba Geigy Co., Ltd.)

Initiator . . . 0.6 parts by weight
(2,2'-bis(o-chlorophenyl)-4,5,4',5'-tetraphenyl-1,2'-biimidazole)
Solvent . . . 80.0 parts by weight
(propylene glycol monomethyl ether acetate)
(Photoresist for Blue (B)-Colored Pixel)
Blue pigment . . . 4.6 parts by weight
(C.I.PB15:6 (trade name: Heliogen Blue L6700F, produced by BASF Corporation))
Purple Pigment . . . 1.4 parts by weight
(C.I.PV23 (trade name: Foster Perm RL-NF, produced by Clariant K. K.))
Pigment derivative . . . 0.6 parts by weight
(trade name: Solsperse 12000, produced by Zeneca)
Dispersant . . . 2.4 parts by weight
(trade name: Solsperse 24000, produced by Zeneca)
Monomer . . . 4.0 parts by weight
(trade name: SR399, produced by Sartomer Company, Inc.)
Polymer 1 . . . 5.0 parts by weight
Initiator . . . 1.4 parts by weight
(trade name: Irgacure 907, produced by Ciba Geigy Co., Ltd.)
Initiator . . . 0.6 parts by weight
(2,2'-bis(o-chlorophenyl)-4,5,4',5'-tetraphenyl-1,2'-biimidazole)
Solvent . . . 80.0 parts by weight
(propylene glycol monomethyl ether acetate)

Here, the polymer 1 is obtained by adding 16.9% by mole of 2-methacryloyloxyethyl isocyanate to 100% by mole of a copolymer of benzyl methacrylate: styrene: acrylic acid: 2-hydroxyethyl methacrylate=15.6:37.0:30.5:16.9 (by molar ratio) and has a weight average molecular weight of 42500.

<Formation of Colored Layer>

A glass substrate (trade name: 7059 Glass, produced by Corning Glass Co., Ltd.) as a cleansed base material was prepared, and a coloring material dispersion solution was coated for every colors on a top surface of the glass substrate as shown below, and thereby, colored layers were stacked and formed on the base material.

First, the BM photoresist prepared as above was coated on the glass substrate by the spin coat method, pre-baked under conditions of 90° C. and 3 min, and exposed with a mask formed in a predetermined pattern (at 100 mJ/cm$^2$). Subsequently, Development by spraying an aqueous solution of 0.05% KOH was applied for 60 sec, followed by post-baking at 200° C. for 30 min, to prepare a base material provided with the BM having a thickness of 1.2 μm(BM-forming base material).

Next, a red (R) pigment-dispersed photoresist prepared in advance so as to correspond to a position corresponding to a red colored pixel was spin coated on the BM-forming base material, and pre-baked at 80° C. for 3 min, followed by exposing UV-ray (300 mJ/cm$^2$) with a photomask for a predetermined colored pattern corresponding to the respective colors. Furthermore, the spray development was applied with an aqueous solution of 0.1% KOH for 60 sec, followed by post-baking at 200° C. for 60 min, to form a pattern of red (R) colored pixels with a film thickness of 2.6 μm at a predetermined position of the BM pattern.

Subsequently, patterns for green (G)-colored pixels and blue (B)-colored pixels were formed respectively by use of a method similar to the method for forming a pattern of the red (R)-colored pixels. Thus, a colored layer constituted of the BM, red-colored pixels, green-colored pixels and blue-colored pixels was formed on the glass substrate.

The thus obtained base material provided with the colored layer was used to prepare a first substrate in the same manner as in Example 1.

Furthermore, by use of the first substrate, a liquid crystal display device was obtained in the same manner as in Example 1.

The front brightness of the obtained liquid crystal display device was measured in the same manner as in Example 1. The front brightness was 0.20 cd/m$^2$.

Example 3

A first substrate was prepared in the same manner as in Example 2, except that a base material was used that had a colored layer provided with colored pixels of the respective colors arranged in a stripe pattern. A birefringent layer was formed on a side of the surface of the base material where the colored layer was formed.

Furthermore, a liquid crystal display device was obtained in the same manner as in Example 1, except that the first substrate was used and polarization plates were disposed as shown below.

<Disposition of Polarization Plate>

Similarly to Example 1, a polarization plate (trade name: HLC2-5618, produced by Sanritz Corporation) is adhered on a surface of a retardation film (trade name: Arton, produced by JSR Co., Ltd.) of a cell having the retardation film adhered thereto (first polarization plate), and a polarization plate similar to above is adhered on an outer surface of the second substrate (second polarization plate). The polarization plates are adhered to the cell so that, when seen in a thickness direction of a birefringent layer, an absorption axis of the first polarization plate and an absorption axis of the second polarization plate are disposed orthogonal to each other. In the example, the first polarization plate was adhered on the surface of the retardation film so that a direction of the absorption axis of the first polarization plate coincided with a longitudinal direction of a stripe type colored pixel.

The front brightness of the obtained liquid crystal display device was measured in the same manner as in Example 1. The front brightness thereof was 0.20 cd/m$^2$.

Comparative Example 1

In Example 1, a liquid crystal display device was obtained in which a first polarization plate and a second polarization plate were adhered to a cell so that, when seen in a thickness direction of a liquid crystal layer, an absorption axis of the first polarization plate was disposed at a position displaced by 45° with respect to a tilt direction of an optical axis of a refractive index ellipse of a birefringent layer and an absorption axis of the first polarization plate and an absorption axis of the second polarization plate were orthogonal to each other.

The front brightness of the obtained liquid crystal display device was measured in the same manner as in Example 1. The front brightness thereof was 0.28 cd/m$^2$.

Comparative Example 2

A liquid crystal display device was obtained in the same manner as in Example 3, except that the first substrate obtained in Example 3 was used and polarization plates were disposed as shown below. That is, in the comparative example, the first polarization plate and the second polarization plate were adhered to a cell so that, when seen in a thickness direction of a liquid crystal layer, an absorption axis of the first polarization plate was disposed at a position displaced by 45° with respect to a longitudinal direction of the stripe type colored pixel and the absorption axis of the first polarization plate and an absorption axis of the second polarization plate were orthogonal to each other.

The front brightness of the obtained liquid crystal display device was measured in the same manner as in Example 1. The front brightness was 0.27 cd/$m^2$.

As described above, it is found from Examples 1 to 3 and Comparative examples 1 and 2 that the light leakage is suppressed in the liquid crystal display devices of the invention.

INDUSTRIAL APPLICABILITY

The liquid crystal display device of the invention can effectively inhibit light from leaking even when the liquid crystal of a birefringent layer is fixed without completely maintaining a homeotropically aligned state.

The invention claimed is:

1. A liquid crystal display device, comprising:

substrates that oppose to each other with a liquid crystal layer containing a liquid crystal variable in an aligned state interposed therebetween, a first polarization plate and a second polarization plate disposed with the opposite substrates interposed therebetween so that their absorption axes are orthogonal to each other; and a birefringent layer formed between the first polarization plate and the second polarization plate by polymerizing a polymerizable liquid crystal, with an optical axis thereof inclined to a thickness direction of the birefringent layer, wherein the optical axis of the birefringent layer is inclined, with respect to the thickness direction of the birefringent layer, in a direction of an absorption axis of any one of the first polarization plate and the second polarization plate.

2. The liquid crystal display device according to claim 1, wherein the birefringent layer is formed by polymerizing the polymerizable liquid crystal in a homeotropically aligned state.

3. The liquid crystal display device according to claim 1, wherein the birefringent layer is formed by three-dimensionally crosslinking/polymerizing a polymerizable liquid crystal having a bar-like molecular shape.

4. The liquid crystal display device according to claim 1, wherein the optical axis of the birefringent layer is uniformly inclined over an entire surface of the birefringent layer.

5. The liquid crystal display device according to claim 1, wherein the birefringent layer is laminated and formed between the opposite substrates.

6. The liquid crystal display device according to claim 1, wherein a colored layer is formed on at least one of the opposite substrates.

7. The liquid crystal display device according to claim 6, wherein the birefringent layer is formed on a surface of the colored layer.

8. The liquid crystal display device according to claim 7, wherein the colored layer includes colored pixels that are formed disposed in a stripe layout pattern and allow light having a predetermined wavelength to transmit, and a direction of an absorption axis of any one of the first polarization plate and the second polarization plate coincides with a longitudinal direction of the stripe colored pixels.

9. The liquid crystal display device according to claim 1, wherein a different birefringent layer having an optical axis different from that of the birefringent layer having an inclined optical axis is formed between the birefringent layer having an inclined optical axis and the first polarization plate.

10. The liquid crystal display device according to claim 6, wherein the birefringent layer having an inclined optical axis is formed between the substrate on which a colored layer is formed and a liquid crystal layer, and a different birefringent layer having an optical axis different from that of the birefringent layer having an inclined optical axis is formed between the substrate on which a colored layer is formed and the first polarization plate.

11. The liquid crystal display device according to claim 1, wherein a different birefringent layer having an optical axis different from that of the birefringent layer having an inclined optical axis is formed between the birefringent layer having an inclined optical axis and the first polarization plate, and an optical axis of the different birefringent layer coincides in a direction with a direction of the absorption axis of the first polarization plate or the second polarization plate.

12. The liquid crystal display device according to claim 6, wherein a different birefringent layer having an optical axis different from that of the birefringent layer having an inclined optical axis is disposed between the birefringent layer having an inclined optical axis and the first polarization plate and formed between the substrate on which a colored layer is formed and a liquid crystal layer, and an optical axis of the different birefringent layer coincides in a direction with a direction of the absorption axis of the first polarization plate or the second polarization plate.

13. The liquid crystal display device according to claim 9, wherein the different birefringent layer is provided with a film material.

* * * * *